(12) United States Patent
Wilson et al.

(10) Patent No.: US 8,700,569 B1
(45) Date of Patent: *Apr. 15, 2014

| (54) | SYSTEM AND METHOD FOR THE MERGING OF DATABASES |
|---|---|
| (71) | Applicant: Bertec Corporation, Columbus, OH (US) |
| (72) | Inventors: Todd Christopher Wilson, Columbus, OH (US); Necip Berme, Worthington, OH (US) |
| (73) | Assignee: Bertec Corporation, Columbus, OH (US) |
| ( * ) | Notice: Subject to any disclaimer, the term of this patent is extended or adjusted under 35 U.S.C. 154(b) by 0 days. This patent is subject to a terminal disclaimer. |
| (21) | Appl. No.: 13/775,159 |
| (22) | Filed: Feb. 23, 2013 |

Related U.S. Application Data

(63) Continuation-in-part of application No. 13/467,472, filed on May 9, 2012, now Pat. No. 8,543,540.

(51) Int. Cl.
    *G06F 7/00* (2006.01)
(52) U.S. Cl.
    USPC .......................................................... 707/626
(58) Field of Classification Search
    None
    See application file for complete search history.

(56) References Cited

U.S. PATENT DOCUMENTS

| 4,631,673 A | 12/1986 | Haas et al. |
|---|---|---|
| 5,628,004 A | 5/1997 | Gormley et al. |
| 5,721,909 A | 2/1998 | Oulid-Aissa et al. |
| 5,806,074 A | 9/1998 | Souder et al. |
| 5,862,327 A | 1/1999 | Kwang et al. |
| 5,870,765 A | 2/1999 | Bauer et al. |
| 5,873,096 A | 2/1999 | Lim et al. |
| 5,899,998 A | 5/1999 | McGauley et al. |
| 5,924,094 A | 7/1999 | Sutter |
| 5,937,414 A | 8/1999 | Souder et al. |

(Continued)

FOREIGN PATENT DOCUMENTS

| CA | 2375260 A1 | 9/2000 |
|---|---|---|
| EP | 1024441 A2 | 8/2000 |

(Continued)

OTHER PUBLICATIONS

First office action on the merits (Non-Final Rejection) in U.S. Appl. No. 13/467,472, mailed on Aug. 14, 2012.

(Continued)

*Primary Examiner* — Fred I Ehichioya
*Assistant Examiner* — Richard Bowen
(74) *Attorney, Agent, or Firm* — The Law Office of Patrick F. O'Reilly III, LLC

(57) ABSTRACT

A system and method for merging a first database with a second database (one-way merge), and a system and method for merging two databases with one another (two-way merge) is described herein. During the one-way merge, new or updated records are transferred from a copy of a client database to a server database after it is determined that the server database either does not contain one or more records in the copy of the client database or contains an older version of one or more records in the copy of the client database. During the two-way merge, new or updated records are transferred between a client database and a server database after it is determined that either the client database or the server database does not contain one or more records in the other database or contains an older version of one or more records in the other database.

18 Claims, 11 Drawing Sheets

(One-Way Merge)

(56) References Cited

U.S. PATENT DOCUMENTS

| | | |
|---|---|---|
| 5,956,719 A | 9/1999 | Kudo et al. |
| 6,016,478 A | 1/2000 | Zhang et al. |
| 6,038,488 A | 3/2000 | Barnes et al. |
| 6,113,237 A | 9/2000 | Ober et al. |
| 6,125,369 A | 9/2000 | Wu et al. |
| 6,152,564 A | 11/2000 | Ober et al. |
| 6,223,187 B1 | 4/2001 | Boothby et al. |
| 6,295,541 B1 | 9/2001 | Bodnar et al. |
| 6,295,878 B1 | 10/2001 | Berme |
| 6,354,155 B1 | 3/2002 | Berme |
| 6,389,883 B1 | 5/2002 | Berme et al. |
| 6,446,092 B1 | 9/2002 | Sutter |
| 6,460,051 B1 | 10/2002 | LaRue et al. |
| 6,470,329 B1 | 10/2002 | Livschitz |
| 6,516,327 B1 | 2/2003 | Zondervan et al. |
| 6,535,892 B1 | 3/2003 | LaRue et al. |
| 6,539,381 B1 | 3/2003 | Prasad et al. |
| 6,633,924 B1 | 10/2003 | Wu et al. |
| 6,718,348 B1 | 4/2004 | Novak et al. |
| 6,915,312 B2 | 7/2005 | Bodnar et al. |
| 6,936,016 B2 | 8/2005 | Berme et al. |
| 7,222,141 B2 | 5/2007 | Zondervan et al. |
| 7,487,186 B2 | 2/2009 | Shimshoni |
| 7,490,112 B1 | 2/2009 | Suresh et al. |
| 7,606,881 B2 | 10/2009 | Chasman et al. |
| 7,617,540 B2 | 11/2009 | Kim et al. |
| 7,953,794 B2 | 5/2011 | Clarke et al. |
| 7,966,287 B2 | 6/2011 | Brown |
| 8,181,541 B2 | 5/2012 | Berme |
| 8,315,822 B2 | 11/2012 | Berme et al. |
| 8,315,823 B2 | 11/2012 | Berme et al. |
| 2003/0216656 A1 | 11/2003 | Berme et al. |
| 2005/0099963 A1 | 5/2005 | Multer et al. |
| 2005/0149582 A1 | 7/2005 | Wissmann et al. |
| 2005/0184857 A1 | 8/2005 | Roatis et al. |
| 2006/0161516 A1 | 7/2006 | Clarke et al. |
| 2007/0282848 A1 | 12/2007 | Kiilerich et al. |
| 2008/0098042 A1 | 4/2008 | Tian et al. |
| 2008/0120270 A1 | 5/2008 | Lamberts |
| 2008/0144624 A1 | 6/2008 | Marcondes et al. |
| 2008/0163743 A1 | 7/2008 | Freedman |
| 2008/0228110 A1 | 9/2008 | Berme |
| 2009/0287746 A1 | 11/2009 | Brown |
| 2010/0274587 A1 | 10/2010 | Gamboa et al. |
| 2011/0277562 A1 | 11/2011 | Berme |
| 2011/0289100 A1 | 11/2011 | Madhavarapu et al. |
| 2012/0030173 A1 | 2/2012 | Freedman |
| 2012/0209808 A1 | 8/2012 | Tien et al. |
| 2012/0239704 A1 | 9/2012 | O'Farrell et al. |
| 2012/0266648 A1 | 10/2012 | Berme et al. |
| 2012/0271565 A1 | 10/2012 | Berme et al. |

FOREIGN PATENT DOCUMENTS

| | | |
|---|---|---|
| EP | 1131757 B1 | 5/2005 |
| JP | 2000235513 A | 8/2000 |
| JP | 2008537255 A | 9/2008 |
| WO | 2008058927 A2 | 5/2008 |

OTHER PUBLICATIONS

Second office action on the merits (Final Rejection) in U.S. Appl. No. 13/467,472, mailed on Nov. 5, 2012.

Third office action on the merits (Non-Final Rejection) in U.S. Appl. No. 13/467,472, mailed on Mar. 22, 2013.

(One-Way Merge)

FIG. 10 (Two-Way Merge)

SYSTEM AND METHOD FOR THE MERGING OF DATABASES

CROSS-REFERENCE TO RELATED APPLICATIONS

This patent application is a continuation-in-part application, which is co-pending with, and claims priority from, U.S. Non-Provisional patent application Ser. No. 13/467,472, entitled "System and Method for the Merging of Databases", filed on May 9, 2012, which is incorporated by reference herein in its entirety by this reference thereto.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a system and method for the merging of databases. More particularly, the invention relates to a system and method for merging a first database with a second database (one-way merge), and a system and method for merging two databases with one another (two-way merge).

2. Background

Presently, there are many businesses that utilize mixed office computing systems. In such a system, for example, some of the computers may comprise in-the-field laptops with no network connectivity, whereas other computers may include desktop-based computing systems. Because some of the individual computers in the mixed office system are not connected to one another, and also are not storing all files on a common server (e.g., in-the-field laptops with no network connectivity), there is a great potential for the creation of many disparate copies of the same database. While many of these businesses with disparate copies of the same database do not need real-time data updates, they often desire end-of-the-day database merging wherein the database content of a first computer (e.g., in-the-field laptop with no network connectivity) is merged with the database content of a second computer (e.g., desktop computer).

Existing database systems do not adequately accommodate this particular mixed office distributed model. Some of the conventional database systems are either standalone with no connectivity at all, whereas other conventional database systems require "always-on" network connectivity via a virtual private network (VPN). As such, the traditional database systems do not permit the merging of disparate copies of the same database between computers with intermittent connectivity.

What is needed, therefore, is a system and method for the merging of databases that offers greater flexibility in connectivity, wherein individual computers in the system can be connected on an ad hoc basis to merge the database results when needed, with no requirements for the availability of a network connection. Moreover, a system and method for the merging of databases is needed that can utilized in a disconnected network, wherein a copy of the database can be made on removable media and given, or shipped, to a different system and merged in that fashion. Furthermore, a need exists for a system and method for the merging of databases that can be effectively utilized without compromising the security of a secure computing network.

BRIEF SUMMARY OF THE INVENTION

Accordingly, the present invention is directed to a system and method for the merging of databases that substantially obviates one or more problems resulting from the limitations and deficiencies of the related art.

In accordance with one aspect of the present invention, there is provided a method for merging a first database with a second database, which includes the following steps: (a) providing first and second computing devices having respective first and second databases stored thereon, the first and second databases each comprising one or more records, each of the one or more records having a unique identifier and a timestamp associated therewith; (b) making a copy of the first database available to the second computing device so that the second computing device is capable of reading the first database; (c) comparing, by using the second computing device, a first listing comprising one or more unique identifiers associated with the one or more records in the first database to a second listing comprising one or more unique identifiers associated with the one or more records in the second database without performing any type of conflict detection or determination; (d) determining, by using the second computing device, whether each of the one or more unique identifiers in the first listing exists in the second listing; (e) when it is determined that one or more unique identifiers in the first listing do not exist in the second listing, copying one or more records associated with the one or more unique identifiers that do not exist from the first database to the second database; (f) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure; and (g) when it is determined that one or more records in the first listing have a more recent timestamp than one or more corresponding records in the second listing with matching unique identifiers, copying the one or more records having more recent timestamps from the first database to the second database without first checking the one or more records for conflicts and without making any determination as to whether or not a conflict exists.

In a further embodiment of this aspect of the present invention, the method further comprises the steps of: (i) utilizing the first computing device for making a backup copy of the first database, the first computing device storing the backup copy of the first database on a form of electronic media or a shared device; and (ii) utilizing the electronic media or the shared device to make the backup copy of the first database available to the second computing device.

In yet a further embodiment, the one or more unique identifiers comprise one or more globally unique identifiers.

In still a further embodiment, the one or more globally unique identifiers are expressed in a numerical or alphanumerical notation for encoding binary data.

In yet a further embodiment, the numerical or alpha-numerical notation for encoding binary data comprises one of the following: (i) hexadecimal notation, (ii) base32 notation, (iii) base64 notation, and (iv) ascii85 notation.

In still a further embodiment, the one or more globally unique identifiers comprise one of the following: (i) one or more mathematically random numbers, (ii) one or more mathematically pseudo-random numbers, and (iii) one or more heuristic values based upon content of one or more fields of the one or more records in one or more tables.

In yet a further embodiment, the one or more timestamps comprise both the dates and times when the one or more records were last modified.

In still a further embodiment, the one or more timestamps are expressed in the form of Julian dates.

In yet a further embodiment, the first computing device is a client computing device and the second computing device is a server computing device.

In accordance with another aspect of the present invention, there is provided a method for merging two databases with one another, which includes the steps of: (a) providing first and second computing devices having respective first and second databases stored thereon, the first and second databases each comprising one or more records, each of the one or more records having a unique identifier and timestamp associated therewith; (b) connecting the first computing device with the second computing device by utilizing a network connection; (c) sending a first listing of one or more unique identifiers and timestamps associated with the one or more records in the first database from the first computing device to the second computing device; (d) comparing, by using the second computing device, the first listing comprising the one or more unique identifiers associated with the one or more records in the first database to a second listing comprising one or more unique identifiers associated with the one or more records in the second database without performing any type of conflict detection or determination; (e) determining, by using the second computing device, whether each of the one or more unique identifiers in the first listing exists in the second listing, and whether each of the one or more unique identifiers in the second listing exists in the first listing; (f) when it is determined that one or more unique identifiers in the first listing do not exist in the second listing, adding one or more records associated with the one or more unique identifiers that do not exist to a record request list; (g) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure; (h) when it is determined that one or more records in the first listing have a more recent timestamp than one or more corresponding records in the second listing with matching unique identifiers, adding the one or more records having more recent timestamps to the record request list without first checking the one or more records for conflicts and without making any determination as to whether or not a conflict exists; (i) when it is determined that one or more records in the second listing have a more recent timestamp than one or more corresponding records in the first listing with matching unique identifiers, adding the one or more records having more recent timestamps to a record send list without first checking the one or more records for conflicts and without making any determination as to whether or not a conflict exists; (j) when it is determined that one or more unique identifiers in the second listing do not exist in the first listing, adding one or more records associated with the one or more unique identifiers that do not exist to the record send list; (k) transferring the record request list from the second computing device to the first computing device; (l) exporting the one or more records listed on the record request list from the first computing device to the second computing device; and (m) exporting the one or more records listed on the record send list from the second computing device to the first computing device.

In a further embodiment of this aspect of the present invention, the one or more unique identifiers comprise one or more globally unique identifiers.

In yet a further embodiment, the one or more globally unique identifiers are expressed in a numerical or alphanumerical notation for encoding binary data.

In still a further embodiment, the numerical or alpha-numerical notation for encoding binary data comprises one of the following: (i) hexadecimal notation, (ii) base32 notation, (iii) base64 notation, and (iv) ascii85 notation.

In yet a further embodiment, the one or more globally unique identifiers comprise one of the following: (i) one or more mathematically random numbers, (ii) one or more mathematically pseudo-random numbers, and (iii) one or more heuristic values based upon content of one or more fields of the one or more records in one or more tables.

In still a further embodiment, the one or more timestamps comprise both the dates and times when the one or more records were last modified.

In yet a further embodiment, the one or more timestamps are expressed in the form of Julian dates.

In still a further embodiment, the first computing device is a client computing device and the second computing device is a server computing device.

In yet a further embodiment, the network connection is an encrypted network connection.

In accordance with yet another aspect of the present invention, there is provided a system for merging a first database with a second database, which includes: first and second computing devices, each of the first and second computing devices including a microprocessor and memory, the first and second computing devices having respective first and second databases stored thereon, the first and second databases each comprising one or more records, each of the one or more records having a unique identifier and timestamp associated therewith; and a data transfer device configured to make a copy of the first database available to the second computing device so that the second computing device is capable of reading the first database. The second computing device being specially programmed to: (a) compare a first listing comprising one or more unique identifiers associated with the one or more records in the first database to a second listing comprising one or more unique identifiers associated with the one or more records in the second database without performing any type of conflict detection or determination; (b) determine whether each of the one or more unique identifiers in the first listing exists in the second listing; (c) when it is determined that one or more unique identifiers in the first listing do not exist in the second listing, copy one or more records associated with the one or more unique identifiers that do not exist from the first database to the second database; (d) when it is determined that one or more unique identifiers in the first listing also exist in the second listing, further determine a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure; and (e) when it is determined that one or more records in the first listing have a more recent timestamp than one or more corresponding records in the second listing with matching unique identifiers, copy the one or more records having more recent timestamps from the first database to the second database without first checking the one or more records for conflicts and without making any determination as to whether or not a conflict exists.

In accordance with still another aspect of the present invention, there is provided a system for merging two databases with one another, which includes: first and second computing devices, each of the first and second computing devices including a microprocessor and memory, the first and second computing devices having respective first and second databases stored thereon, the first and second databases each comprising one or more records, each of the one or more records having a unique identifier and timestamp associated therewith, the first and second computing devices being operatively connected to one another by a network connection, the first computing device being configured to send a first listing of one or more unique identifiers and timestamps associated with the one or more records in the first database to the second computing device. The second computing device being specially programmed to: (a) compare the first listing comprising the one or more unique identifiers associated with the one or more records in the first database to a second listing comprising one or more unique identifiers associated with the one or more records in the second database without performing any type of conflict detection or determination; (b) determine whether each of the one or more unique identifiers in the first listing exists in the second listing, and whether each of the one or more unique identifiers in the second listing exists in the first listing; (c) when it is determined that one or more unique identifiers in the first listing do not exist in the second listing, add one or more records associated with the one or more unique identifiers that do not exist to a record request list; (d) when it is determined that one or more unique identifiers in the first listing also exist in the second listing, further determining a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure; (e) when it is determined that one or more records in the first listing have a more recent timestamp than one or more corresponding records in the second listing with matching unique identifiers, add the one or more records having more recent timestamps to the record request list without first checking the one or more records for conflicts and without making any determination as to whether or not a conflict exists; (f) when it is determined that one or more records in the second listing have a more recent timestamp than one or more corresponding records in the first listing with matching unique identifiers, add the one or more records having more recent timestamps to a record send list without first checking the one or more records for conflicts and without making any determination as to whether or not a conflict exists; and (g) when it is determined that one or more unique identifiers in the second listing do not exist in the first listing, add one or more records associated with the one or more unique identifiers that do not exist to the record send list. In this embodiment, the second computing device is configured to transfer the record request list to the first computing device; the first computing device is configured to export the one or more records listed on the record request list to the second computing device, and the second computing device is configured to export the one or more records listed on the record send list to the first computing device.

In a further embodiment of this aspect of the present invention, the second computing device is additionally programmed to enable a system user to selectively choose between one of the following two operational modes: (i) a one-way merge mode, wherein the first database is merged with the second database by utilizing the data transfer device to make the copy of the first database available to the second computing device; and (ii) a two-way merge mode, wherein the first and second databases are merged with one another by utilizing a network connection to operatively connect the first and second computing devices to each other.

In accordance with yet another aspect of the present invention, there is provided a method for merging databases, which comprising the steps of: (a) providing first and second computing devices having respective first and second databases stored thereon, the first and second databases each comprising one or more records containing data, each of the one or more records having a unique identifier and a timestamp associated therewith; (b) operating the second computing device in a one-way merge mode, wherein the first database is merged with the second database by utilizing removable electronic media or a shared device to make a copy of the first database available to the second computing device; and (c) operating the second computing device in a two-way merge mode, wherein the first and second databases are merged with one another by utilizing a network connection to operatively connect the first and second computing devices to each other. When the second computing device is operated in the one-way merge mode, the following steps are performed: (i) making the copy of the first database available to the second computing device using the removable electronic media or the shared device so that the second computing device is capable of reading the first database; (ii) comparing, by using the second computing device, a first listing comprising one or more unique identifiers associated with the one or more records in the first database to a second listing comprising one or more unique identifiers associated with the one or more records in the second database without checking the data in each of the one or more records for conflicts and without using a transaction or activity log; (iii) determining, by using the second computing device, whether each of the one or more unique identifiers in the first listing exists in the second listing; (iv) when it is determined that one or more unique identifiers in the first listing do not exist in the second listing, copying one or more records associated with the one or more unique identifiers that do not exist from the first database to the second database; (v) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the one-way merge mode; and (vi) when it is determined that one or more records in the first listing have a more recent timestamp than one or more corresponding records in the second listing with matching unique identifiers, copying the one or more records having more recent timestamps from the first database to the second database without first checking the data in each of the one or more records for conflicts. And, when the second computing device is operated in the one-way merge mode, the following steps are performed: (i) connecting the first computing device with the second computing device by utilizing the network connection; (ii) sending a first listing of one or more unique identifiers and timestamps associated with the one or more records in the first database from the first computing device to the second computing device; (iii) comparing, by using the second computing device, the first listing comprising the one or more unique identifiers associated with the one or more records in the first database to a second listing comprising one or more unique identifiers associated with the one or more records in the second database without checking the data in each of the one or more records for conflicts and without using a transaction or activity log; (iii) determining, by using the second computing device, whether each of the one or more unique identifiers in the first listing exists in the second listing, and whether each of the one or more unique identifiers in the second listing exists in the first listing; (iv) when it is determined that one or more unique identifiers in the first listing do not exist in the second listing, adding one or more records associated with the one or more unique identifiers that do not exist to a record request list; (v) when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the one-way merge mode; (vi) when it is determined that one or more records in the first listing have a more recent timestamp than one or more corresponding records in the second listing with matching unique identifiers, adding the one or more records having more recent timestamps to the record request list without first checking the data in each of the one or more records for conflicts; (vii) when it is determined that one or more records in the second listing have a more recent timestamp than one or more corresponding records in the first listing with matching unique identifiers, adding the one or more records having more recent timestamps to a record send list; (viii) when it is determined that one or more unique identifiers in the second listing do not exist in the first listing, adding one or more records associated with the one or more unique identifiers that do not exist to the record send list; (ix) transferring the record request list from the second computing device to the first computing device; (xii) exporting the one or more records listed on the record request list from the first computing device to the second computing device; and (xiii) exporting the one or more records listed on the record send list from the second computing device to the first computing device.

In accordance with still another aspect of the present invention, there is provided a system for merging two databases, which includes: first and second computing devices, each of the first and second computing devices including a microprocessor and memory, the first and second computing devices having respective first and second databases stored thereon, the first and second databases each comprising one or more records containing data, each of the one or more records having a unique identifier and timestamp associated therewith; removable electronic media or a shared device configured to make a copy of the first database available to the second computing device so that the second computing device is capable of reading the first database; the second computing device being specially programmed to operate in both of the following two modes: (i) a one-way merge mode, wherein the first database is merged with the second database by utilizing the removable electronic media or the shared device to make the copy of the first database available to the second computing device; and (ii) a two-way merge mode, wherein the first and second databases are merged with one another by utilizing a network connection to operatively connect the first and second computing devices to each other. The second computing device is specially programmed to carry out the following operations in the one-way merge mode: (i) compare a first listing comprising one or more unique identifiers associated with the one or more records in the first database residing on the removable electronic media or the shared device to a second listing comprising one or more unique identifiers associated with the one or more records in the second database without checking the data in each of the one or more records for conflicts and without using a transaction or activity log; (ii) determine whether each of the one or more unique identifiers in the first listing exists in the second listing; (iii) when it is determined that one or more unique identifiers in the first listing also exist in the second listing, further determine a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the one-way merge mode; and (iv) when it is determined that one or more records in the first listing have a more recent timestamp than one or more corresponding records in the second listing with matching unique identifiers, copy the one or more records having more recent timestamps from the first database to the second database without first checking the data in each of the one or more records for conflicts. The second computing device is specially programmed to carry out the following operations in the two-way merge mode: (i) compare a first listing comprising the one or more unique identifiers associated with the one or more records in the first database to a second listing comprising one or more unique identifiers associated with the one or more records in the second database without checking the data in each of the one or more records for conflicts and without using a transaction or activity log, the first listing being sent from the first computing device to the second computing device via the network connection; (ii) determine whether each of the one or more unique identifiers in the first listing exists in the second listing, and whether each of the one or more unique identifiers in the second listing exists in the first listing; (iii) when it is determined that one or more unique identifiers in the first listing do not exist in the second listing, add one or more records associated with the one or more unique identifiers that do not exist to a record request list; (iv) when it is determined that one or more unique identifiers in the first listing also exist in the second listing, further determining a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the one-way merge mode; (v) when it is determined that one or more records in the first listing have a more recent timestamp than one or more corresponding records in the second listing with matching unique identifiers, add the one or more records having more recent timestamps to the record request list without first checking the data in each of the one or more records for conflicts; (vi) when it is determined that one or more records in the second listing have a more recent timestamp than one or more corresponding records in the first listing with matching unique identifiers, add the one or more records having more recent timestamps to a record send list; (vii) when it is determined that one or more unique identifiers in the second listing do not exist in the first listing, add one or more records associated with the one or more unique identifiers that do not exist to the record send list; (viii) wherein, when operating in the two-way merge mode, the second computing device is configured to transfer the record request list to the first computing device; and (ix) wherein, when operating in the two-way merge mode, the first computing device is configured to export the one or more records listed on the record request list to the second computing device, and the second computing device is configured to export the one or more records listed on the record send list to the first computing device.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same components/steps are always denoted using the same reference characters so that, as a general rule, they will only be described once.

DETAILED DESCRIPTION OF THE PREFERRED EMBODIMENTS OF THE INVENTION

The present invention is described herein, in an exemplary manner, with reference to computer system architecture and flowcharts that illustrate exemplary processes carried out by the computer system. In a preferred embodiment, functional blocks of the flowchart illustrations can be implemented by computer system instructions. These computer program instructions may be loaded directly onto an internal data storage device of a computing device (e.g., a hard drive of a computer). Alternatively, these computer program instructions could be stored on a portable computer-readable medium (e.g., a flash drive, a floppy disk, a compact disk, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software.

This description describes in general form the computer program(s) required to carry out one-way and two-way merging of databases. Any competent programmer in the field of information technology could develop a system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate the functional relationships therebetween. In addition to that which is explicitly depicted, it is to be understood that many alternative or additional functional relationships and/or physical connections may be incorporated in a practical application of the system.

1. Exemplary System

Figure 1:
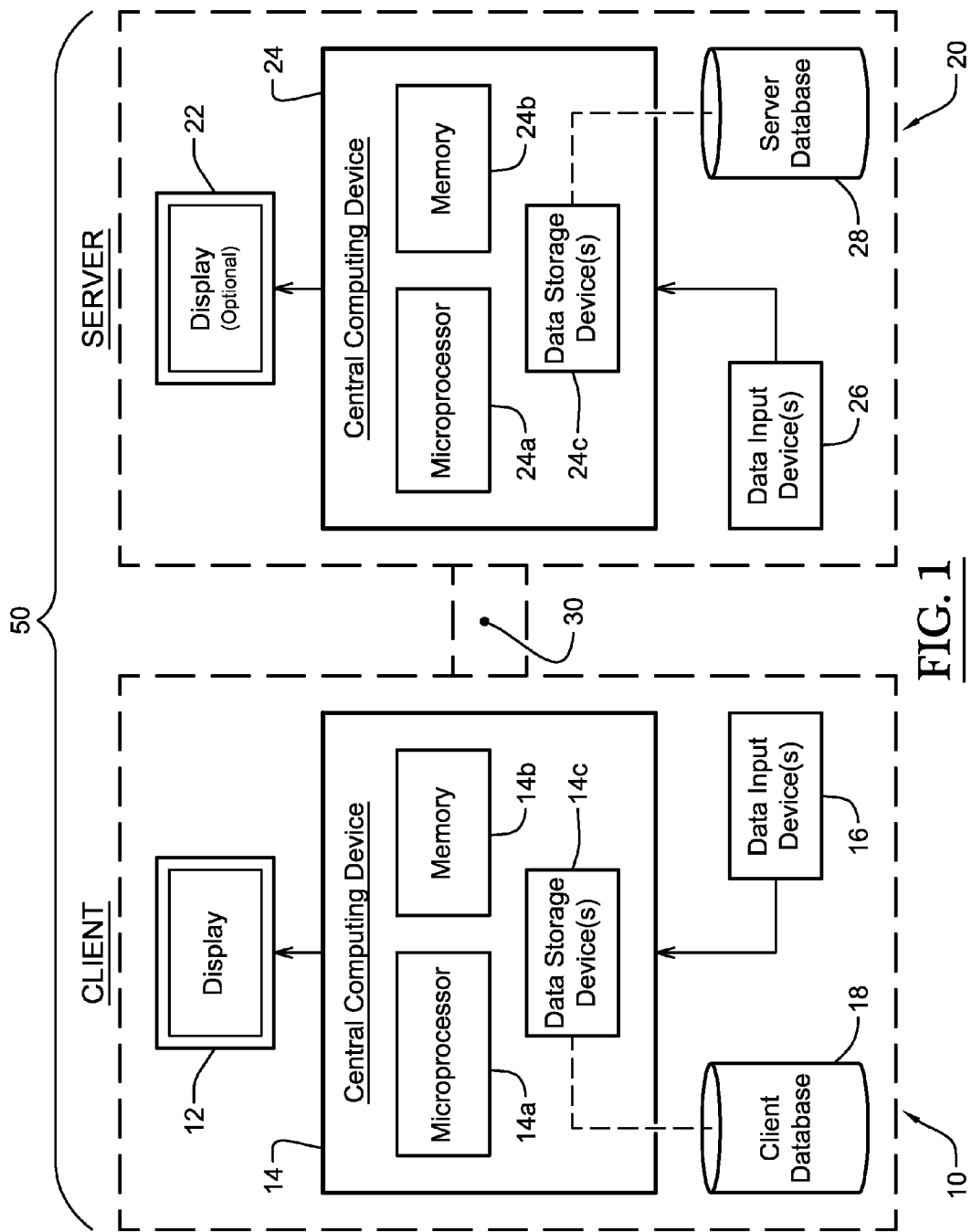
FIG. 1 is a block diagram of an exemplary system for carrying out the merging of databases, according to an embodiment of the invention.

FIG. 1 is a schematic representation of an exemplary computer system 50 for carrying out the merging of databases, according to an embodiment of the invention. The computer system 50 generally comprises a client computing device 10 and a server computing device 20. In some embodiments of the invention, the client computing device 10 and the server computing device 20 are operatively connected to one another via a network connection 30. Preferably, the network connection 30 is an encrypted network connection so that data can be securely transferred between the client computing device 10 and the server computing device 20. The network connection 30 between the computing devices 10, 20 can be a conventional hard-wired connection (e.g., utilizing an Ethernet cable or any other type of suitable data transmission cable), or alternatively, can utilize wireless data transmission technology (e.g., a wireless local area network, commonly referred to as Wi-Fi technology).

However, it is to be understood that a network connection 30 between the computing devices 10, 20 is not required for all embodiments of the invention. In particular, while a network connection 30 is needed for the two-way merge procedure, it is not required for the one-way merge procedure. Rather, in order to carry out the one-way merge procedure hereinafter described, a user can simply make a backup copy of the client database 18 on a form of electronic media (e.g., a flash drive or a compact disk) or a shared device by utilizing the client computing device 10. Then, the user can subsequently make the backup copy of the client database 18 residing on the electronic media or shared device available to the server computing device 20 prior to carrying out the one-way merge procedure (e.g., by inserting the flash drive or the compact disk (CD) into the server computing device 20, or by operatively coupling the shared device to the server computing device 20).

Referring again to FIG. 1, it can be seen that the client computing device 10 includes a central computing device 14 for collecting, storing, and processing data, as well as a plurality of peripheral devices 12, 16 operatively connected thereto. The peripheral devices preferably include a graphical user interface or display 12 (e.g., a monitor) and a plurality of data input devices 16, such as a keyboard and a mouse. As shown in FIG. 1, the central computing device 14 of the client computing device 10 comprises a microprocessor 14$a$ for processing data, memory 14$b$ (e.g., random access memory or RAM) for storing data during the processing thereof, and data storage device(s) 14$c$, such as one or more hard drives, compact disk drives, floppy disk drives, flash drives, or any combination thereof. The client database 18 is stored on a medium of the one or more data storage device(s) 14$c$ of the client computing device 10, such as on the medium of the hard drive of the client computing device 10. In some embodiments, the client computing device 10 can be in the form of a laptop computer, while in other embodiments, the client computing device 10 can be embodied as a desktop computer. While, still in other embodiments, the client computing device 10 may be in the form of a palmtop computing device (i.e., a PDA), a tablet computing device, or any other suitable computing device.

Similarly, as further illustrated in FIG. 1, the server computing device 20 includes a central computing device 24 for collecting, storing, and processing data, as well as a plurality of peripheral devices 22, 26 operatively connected thereto. As described above for the client computing device 10, the peripheral devices could include a graphical user interface or display 22 (e.g., a monitor) and a plurality of data input devices 26, such as a keyboard and a mouse. Moreover, like the client computing device 10, the central computing device 24 of the server computing device 20 comprises a microprocessor 24$a$ for processing data, memory 24$b$ (e.g., random access memory or RAM) for storing data during the processing thereof, and data storage device(s) 24$c$, such as one or more hard drives, compact disk drives, floppy disk drives, flash drives, or any combination thereof. The server database 28 is stored on a medium of the one or more data storage device(s) 24$c$ of the server computing device 20, such as on the medium of the hard drive of the server computing device 20. In some embodiments, the server computing device 20 can be in the form of a desktop computer or a mainframe computer, while in other embodiments, the server computing device 20 can be embodied as a laptop computer. While, still in other embodiments, the server computing device 20 may be in the form of a palmtop computing device (i.e., a PDA), a tablet computing device, or any other suitable computing device.

In another embodiment, the server computing device 20 is in the form of a remote monitoring device that is operatively connected to the client computing device 10 by virtue of a web interface (i.e., a virtual machine). In such an embodiment, the server computing device 20 would not be required to have a display 22, and it could operate without user interaction. Alternatively, the server computing device 20 could provide monitoring and control by means of some user interface (e.g., desktop, remote, web, etc.).

In a preferred embodiment of the invention, one or both of the client database 18 and the server database 28 are encrypted so as to protect the secrecy of the data stored therein. Thus, confidential or proprietary data can be safely stored in the databases 18, 28 without the fear of interception by an unauthorized third party. Also, the database file itself (i.e., containing the database 18 or 28) is preferably a self-contained file that can be directly read, copied, and manipulated by the operating system of the computing device 10, 20. In addition, preferably the self-contained database file is capable of being encrypted at the file-system level.

2. One-Way Merge Procedure

Figure 2:
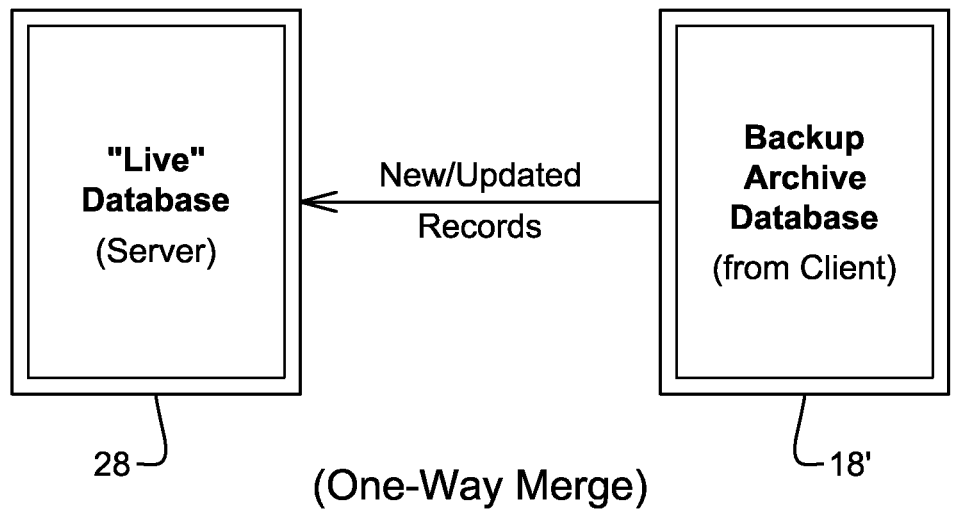
FIG. 2 is a schematic diagram illustrating the merging of a first database with a second database (i.e., a one-way merge), according to an embodiment of the invention.

In FIG. 2, the merging of a first database with a second database (i.e., a one-way merge) is schematically illustrated. In general, during an exemplary one-way merge procedure, new or updated records are transferred from a backup archive database 18' (i.e., a copy of the client database 18) to a "live" database 28 (i.e., the server database) after it is determined that the "live" database 28 either does not contain one or more records in the backup archive database 18' or contains an older version of one or more records in the backup archive database 18'. The records transferred from the backup archive database 18' to the "live" database 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 4:
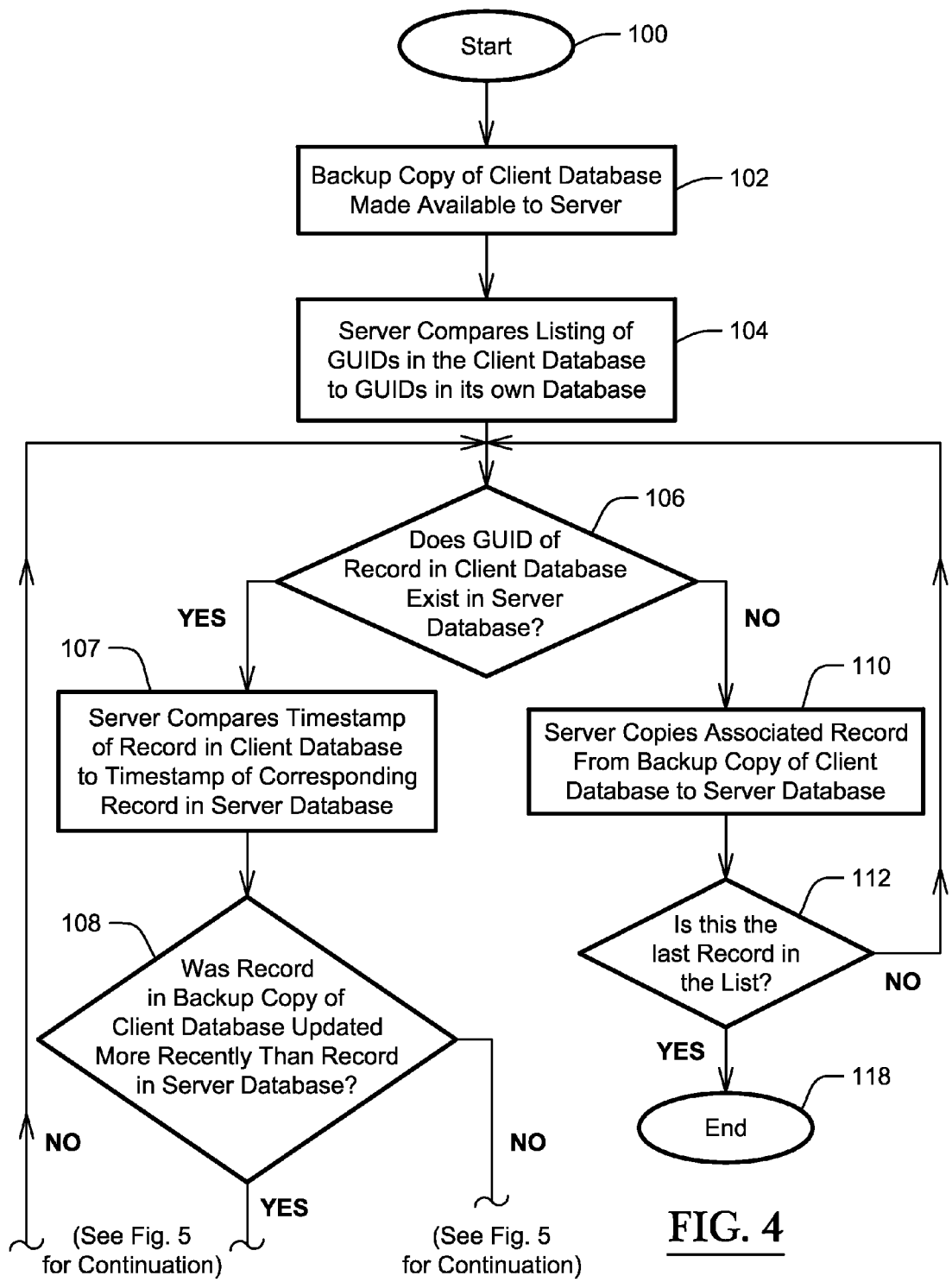
FIG. 4 is a partial flowchart illustrating a one-way merge procedure carried out by the system of FIG. 1, according to an embodiment of the invention.
Figure 5:
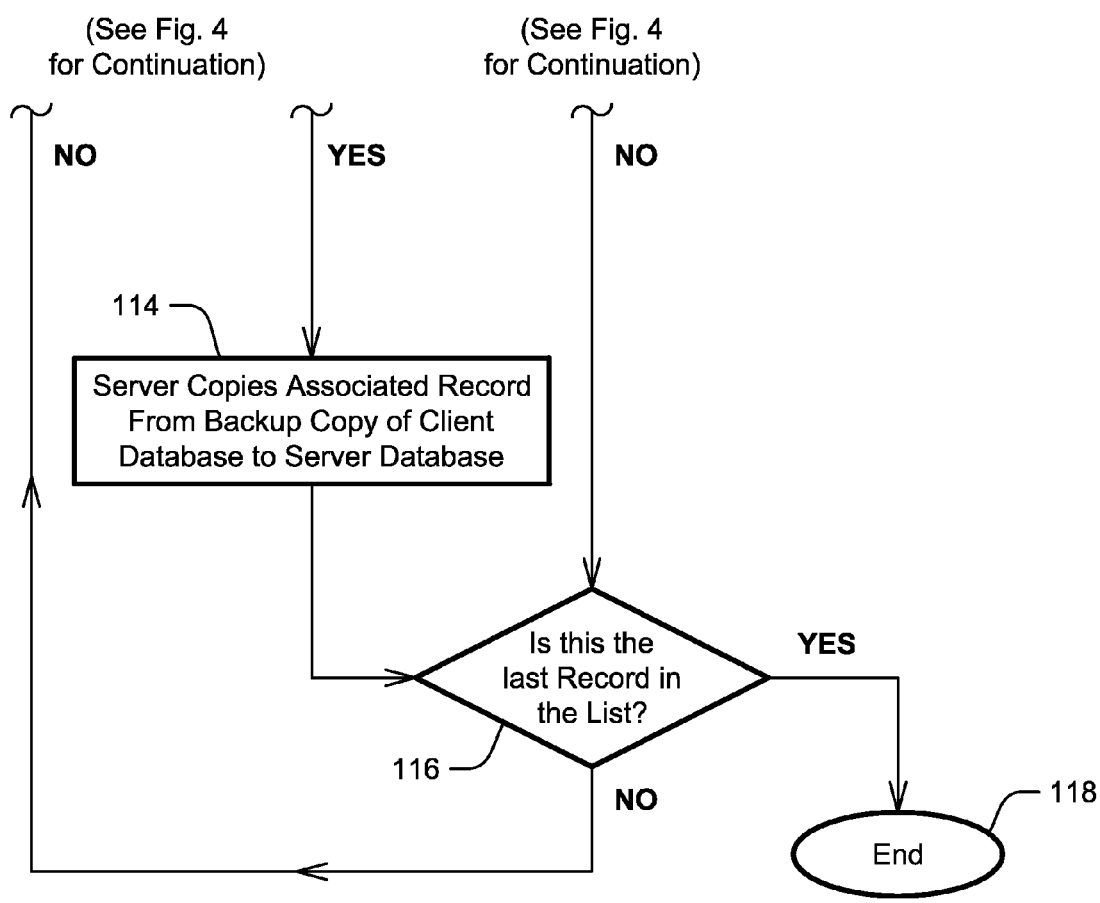
FIG. 5 is a continuation of the flowchart of FIG. 4, which illustrates additional steps of the one-way merge procedure, according to an embodiment of the invention.

In accordance with an embodiment of the invention, a flowchart illustrating a one-way merge procedure carried out by the computer system 50 of FIG. 1 is set forth in FIGS. 4 and 5. Referring initially to FIG. 4, the procedure commences at 100, and in step 102, a backup copy of the client database 18' is made available to the server computing device 20 ("server"). In a preferred embodiment, a data storage/transfer device (e.g., a floppy disk drive, a compact disk (CD) drive, or flash drive) of the client computing device 10 ("client") is utilized for making a backup copy of the entire client database 18 (i.e., not just a portion or subset of the database) by storing the backup copy of the client database 18' on a form of electronic media or a shared device. Then, the electronic media or the shared device is used to make the backup copy of the client database 18' available to the server computing device 20, and the client database 18' is attached to the server database 28 as a supplementary database thereto (e.g., with the name "OtherDatabase"). After which, in step 104, the server compares the listing of globally unique identifiers (GUIDs) in the copy of the client database 18' to the listing of globally unique identifiers (GUIDs) in its own database (i.e., server database 28).

In step 106 (i.e., decision block 106), the server initially determines whether a GUID identifying a particular record in the copy of client database 18' exists in the server database 28. When it is determined that a GUID identifying a particular record in the copy of the client database 18' does not exist in the server database 28, the server copies the associated record from the backup copy of the client database 18' to the server database 28 (step 110 in FIG. 4). After which, in step 112, the server determines if the copied record is the last record in the copy of the client database 18'. If the copied record is the last record in the client database 18, the process ends at step 118. Otherwise, the determination in step 106 is performed for the next record in the listing of records for the client database 18.

When it is determined that a GUID identifying a particular record in the copy of the client database 18' also exists in the server database 28, the server further compares, in step 107, the timestamp of the record in the backup copy of the client database 18' to the timestamp of the corresponding record in the server database 28. Then, in step 108, by means of the timestamp comparison, the server determines whether the record in the backup copy of the client database 18' was updated more recently than the corresponding record in the server database 28. The version of the record having the most recent timestamp associated therewith is deemed to be the record that was most recently updated. In this peer-to-peer system, the timestamps associated with the client database 18' are assigned by the client computing device 10, whereas the timestamps associated with the server database 28 are assigned by the server computing device 20. When it is determined that the version of the record in the backup copy of the client database 18' has a more recent timestamp, and thus was updated more recently, than the version of the record in the server database 28, the server copies the associated record from the backup copy of the client database 18' to the server database 28 (step 114 in FIG. 5). After which, in step 116 of FIG. 5, the server determines if the copied record is the last record in the copy of the client database 18'. If the copied record is the last record in the client database 18, the process ends at step 118. Otherwise, the initial determination in step 106 is performed for the next record in the listing of records for the client database 18.

On the other hand, when it is determined that the version of the record in the backup copy of the client database 18' has an older timestamp as compared to the version of the record in the server database 28, the process proceeds directly to step 116 in FIG. 5, wherein the server determines if that particular record is the last record in the copy of the client database 18'. If it is the last record, the process ends at step 118. If not, the initial determination in step 106 is carried out for the next record in the listing of records for the client database 18. The aforedescribed process is performed by the server until each of the records in the copy of the client database 18' is evaluated.

Advantageously, as described above, the timestamps of the records having common unique identifiers are compared only once during the one-way merge procedure (i.e., in step 107) so as to result in an efficient and streamlined process. In other words, only one comparison of timestamps for a particular pair of records having matching unique identifiers (i.e., GUIDs) is performed during the one-way merge process.

In a preferred embodiment, the globally unique identifiers (GUIDs) utilized for the identification of the records in the client database 18 and the server database 28 comprise a 32-character hexadecimal string, such as {52FC4040-7BCH-8096-C4MM-09001L40407E}, and are stored by the computing devices 10, 20 as 128-bit integers. The hexadecimal digits comprising each GUID can be separated into five groups, each group being separated from adjacent group(s) by means of dashes. In one embodiment, the first group includes eight (8) hexadecimal digits, the second, third, and fourth groups each include four (4) hexadecimal digits, while the fifth group includes twelve (12) hexadecimal digits. Although, one of ordinary skill in the art will appreciate that the hexadecimal string comprising each GUID can utilize a different overall number of characters, different groupings of characters, or a different means of separating the various groups.

In one embodiment of the invention, the globally unique identifiers (GUIDs) can be randomly selected, and may comprise mathematically random numbers or mathematically pseudo-random numbers. While, in another embodiment of the invention, the values for the GUIDs can be based, at least in part, on the content of the fields in the records they are used to designate. For example, the GUIDs could comprise heuristic values based upon a portion of the content in the fields of the records that they represent.

In one exemplary embodiment, records in the database (e.g., 18 or 20) that are associated with the operator (or user) of the system do not get random GUID values for the record identifiers. Rather, the GUIDs used to identify the operator (or user) records are generated based on common names (e.g., Admin, Demo, etc.) that use predefined GUID values, or else are generated by a mathematical checksum computation of the operator name implemented, for example, by the following lines of code:

if (operatorName="Admin")
        return DefaultAdminGUID;
    else if (operatorName="Demo")
        return DefaultDemoGUID;
    else
        return checksum(operatorName);

In the above example, if the operator name is something other than "Admin" or "Demo", then a checksum will be generated by inputting the operator name (e.g., Todd) into a checksum function, thereby producing a numerical checksum value (e.g., 15826340) therefrom. As such, in certain cases, where using a randomly generated GUID value would be incorrect, the GUID value is synthesized from specific record field values (e.g., from the operator name field in the record) so that exact duplicate record data independently created on multiple computing devices will appear to be the same record. In the above example, it is undesirable for the same operator data record on two different computing systems to be assigned different GUID values.

In a preferred embodiment of the invention, the timestamps utilized for indicating the date and time when the records in the client database 18 and the server database 28 were updated are expressed in the form of Julian dates. A Julian date is comprised of the following two parts: (i) the Julian day number, which is the integer part of the Julian date; and (ii) the decimal parts of a Julian date, which are used to denote the time on a particular day. The Julian day number is the number of days that have passed since Jan. 1, 4713 BC (JDN=0) in accordance with the proleptic Julian calendar. The decimal parts of a Julian date are defined as follows:

0.1=2.4 hours, or alternatively 144 minutes or 8640 seconds
    0.01=0.24 hours, or alternatively 14.4 minutes or 864 seconds
    0.001=0.024 hours, or alternatively 1.44 minutes or 86.4 seconds
    0.0001=0.0024 hours, or alternatively 0.144 minutes or 8.64 seconds 0.00001=0.00024 hours, or alternatively 0.0144 minutes or 0.864 seconds.

For example, a Julian date equal to "2455896.10596" corresponds to Wednesday, Nov. 30, 2011 at 14:32:34.9 UT, whereas a Julian date equal to "2455982.13360" corresponds to Friday, Feb. 24, 2012 at 15:12:23.0 UT (or UTC, is the acronym for coordinated universal time).

Advantageously, the utilization of Julian dates for the timestamps provides a consistent format between different locales (e.g., the American and European format is exactly the same). Moreover, the use of Julian dates and coordinated universal time eliminates the issues associated with differing time zones (e.g., it doesn't matter whether the client computing device 10 is located in Columbus, Ohio which is on Eastern Daylight Time (EDT), and the server computing device 20 is located in Los Angeles, Calif., which is on Pacific Daylight Time (PDT)).

In order to advantageously simplify and streamline the merge processes set forth herein, no conflicts check of any kind is performed in either the one-way merge procedure or the two-way merge procedure. As a result, the one-way and two-way merge processes described herein are carried out without checking any of the records residing in the databases being merged for conflicts (e.g., none of the records in the databases 18, 28 are checked for conflicts when a merge process is carried out thereon). Thus, no conflict detection is carried out in conjunction with the merge processes set forth herein, and the data in the records is not checked for conflicts. It is never determined in any of the merge processes described herein whether or not a conflict exists between two records having the same unique identifier (i.e., the same GUID). If a record is newer than the record it is replacing, then the older record simply gets replaced. Because no conflicts check is being performed in either the one-way merge procedure or the two-way merge procedure, these merge processes do not involve any type of conflicts resolution strategy.

In one or more embodiments of the invention, the computing device (e.g., the server computing device 20) is specially programmed to create a backup copy of the database on which the merge is being performed (e.g., the server database 28) before the one-way merge procedure is carried out thereon. Advantageously, the creation of the backup copy of the database (e.g., the server database 28) helps to ensure that valuable data is not inadvertently lost (i.e., this is a safety feature for preventing lost data). In one or more further embodiments, the computing device (e.g., the server computing device 20) is specially programmed so as to enable a system user to selectively choose if he or she wants to automatically create a backup copy of the database residing on his or her computing device prior to the performance of the one-way merge (e.g., by allowing a user to check a box if he or she desires to automatically perform the backup before executing the one-way merge or to uncheck the box if no backup is to be performed before the one-way merge).

3. Two-Way Merge Procedure

Figure 3:
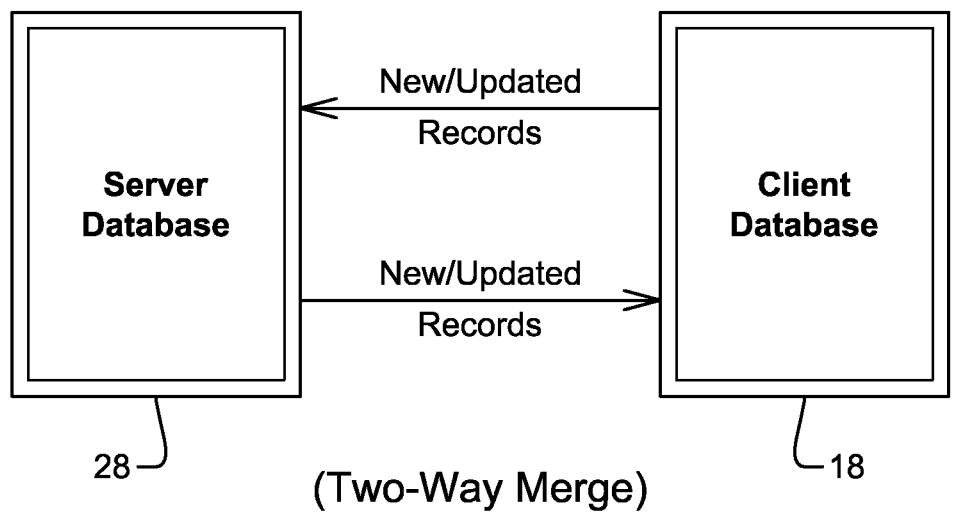
FIG. 3 is a schematic diagram illustrating the merging of two databases with one another (i.e., a two-way merge), according to an embodiment of the invention.

In FIG. 3, the merging of two databases with one another (i.e., a two-way merge) is schematically illustrated. In general, during an exemplary two-way merge procedure, new or updated records are transferred from a client database 18 (residing on one or more of the data storage device(s) 14c of the client computing device 10) to a server database 28 (residing on one or more of the data storage device(s) 24c of the server computing device 20) after it is determined that the server database 28 either does not contain one or more records in the client database 18 or contains an older version of one or more records in the client database 18. Similarly, new or updated records are transferred from the server database 28 to a client database 18 after it is determined that the client database 18 either does not contain one or more records in the server database 28 or contains an older version of one or more records in the server database 28. As described above with regard to the one-way merge, the records transferred between the client and server databases 18, 28 can comprise various forms of data. For example, the records could include any of the following: (i) operator data for an individual conducting subject testing, (ii) anatomical data for a test subject, (iii) numerical data acquired during the testing of a subject, or (iv) a graphical depiction of a test subject. However, one of ordinary skill in the art will readily appreciate that these are merely examples of the type of content which the records may contain. The claimed invention encompasses all possible forms of record content.

Figure 6:
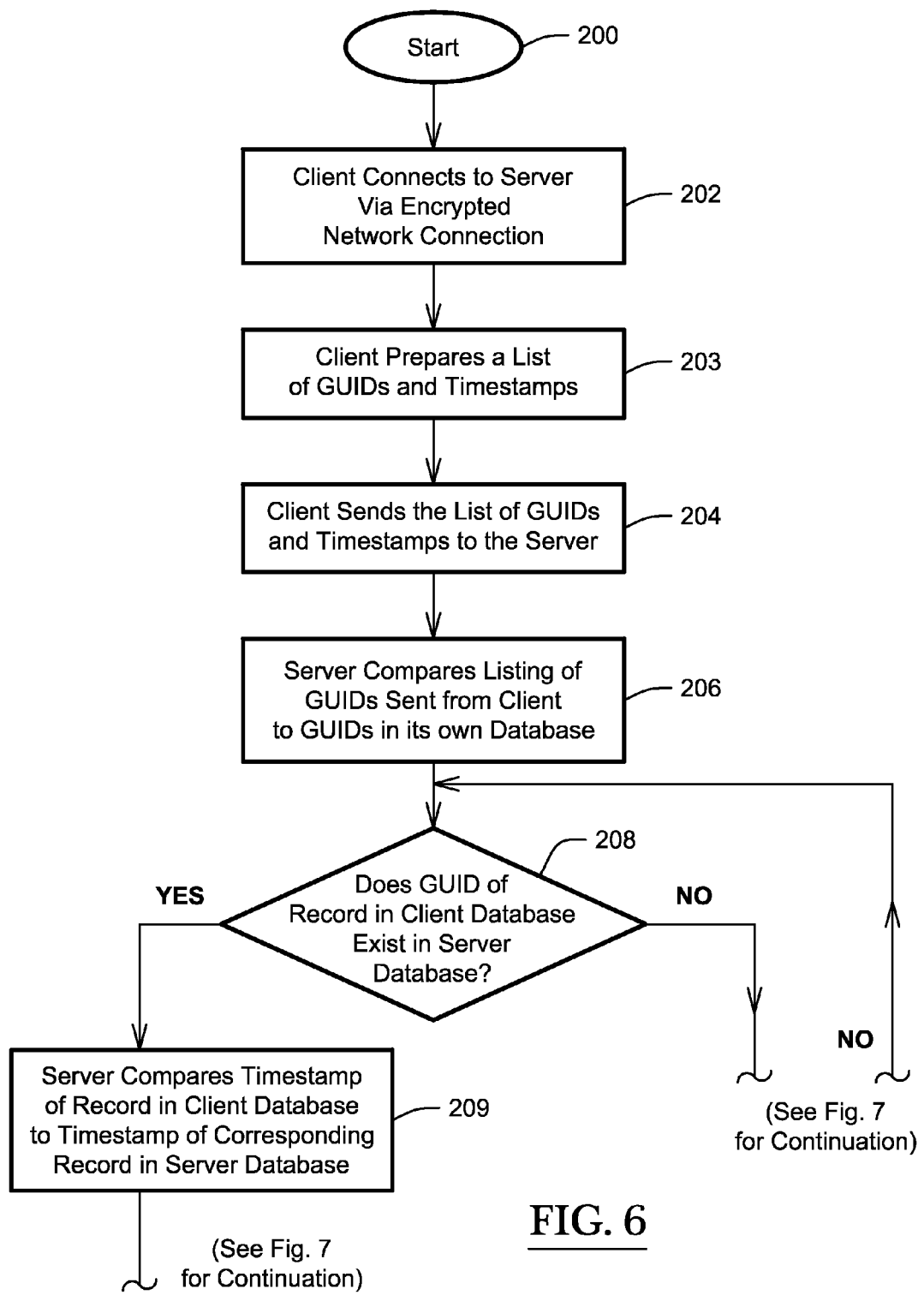
FIG. 6 is a partial flowchart illustrating a two-way merge procedure carried out by the system of FIG. 1, according to an embodiment of the invention.
Figure 7:
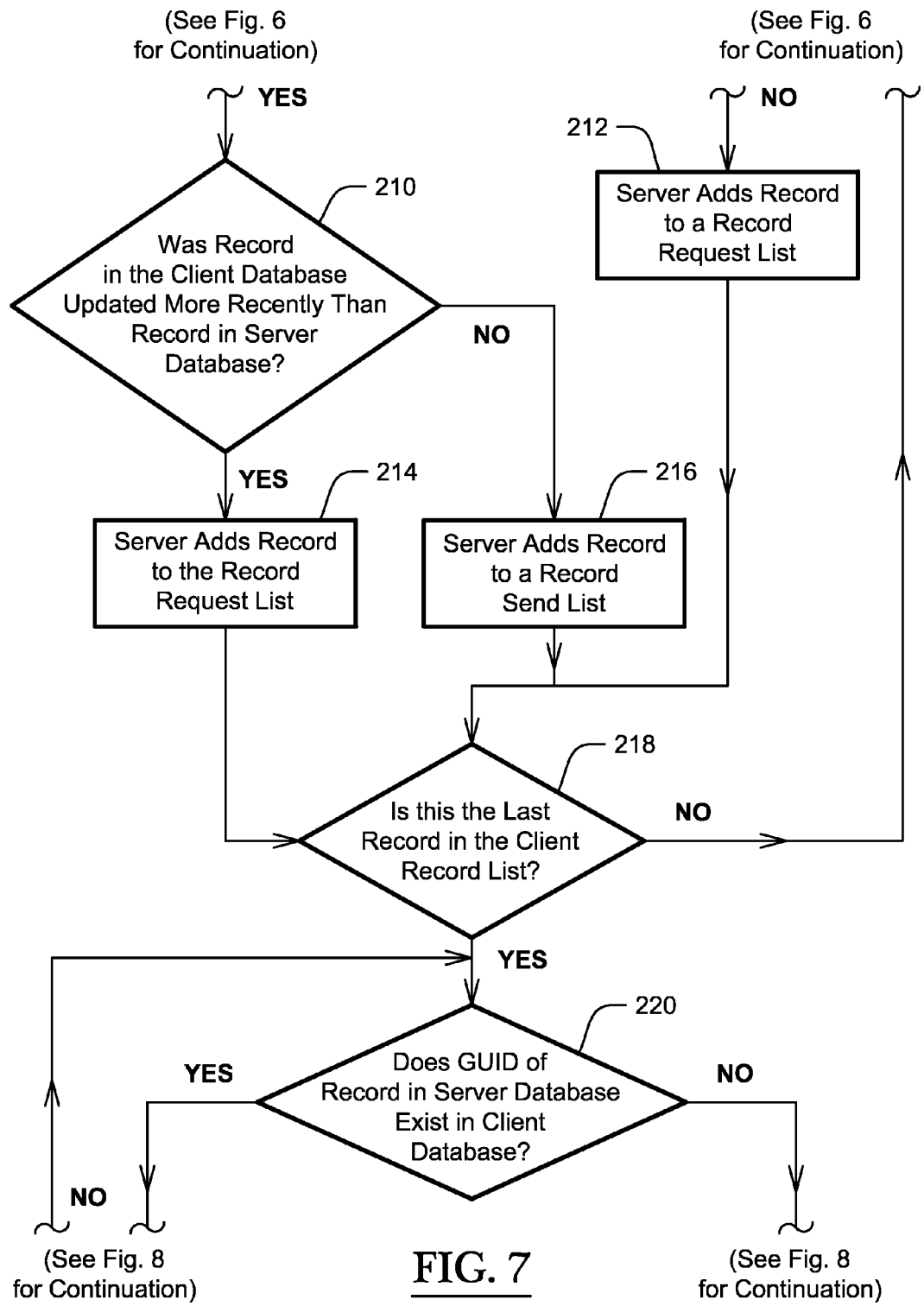
FIG. 7 is a continuation of the flowchart of FIG. 6, which illustrates additional steps of the two-way merge procedure, according to an embodiment of the invention.
Figure 8:
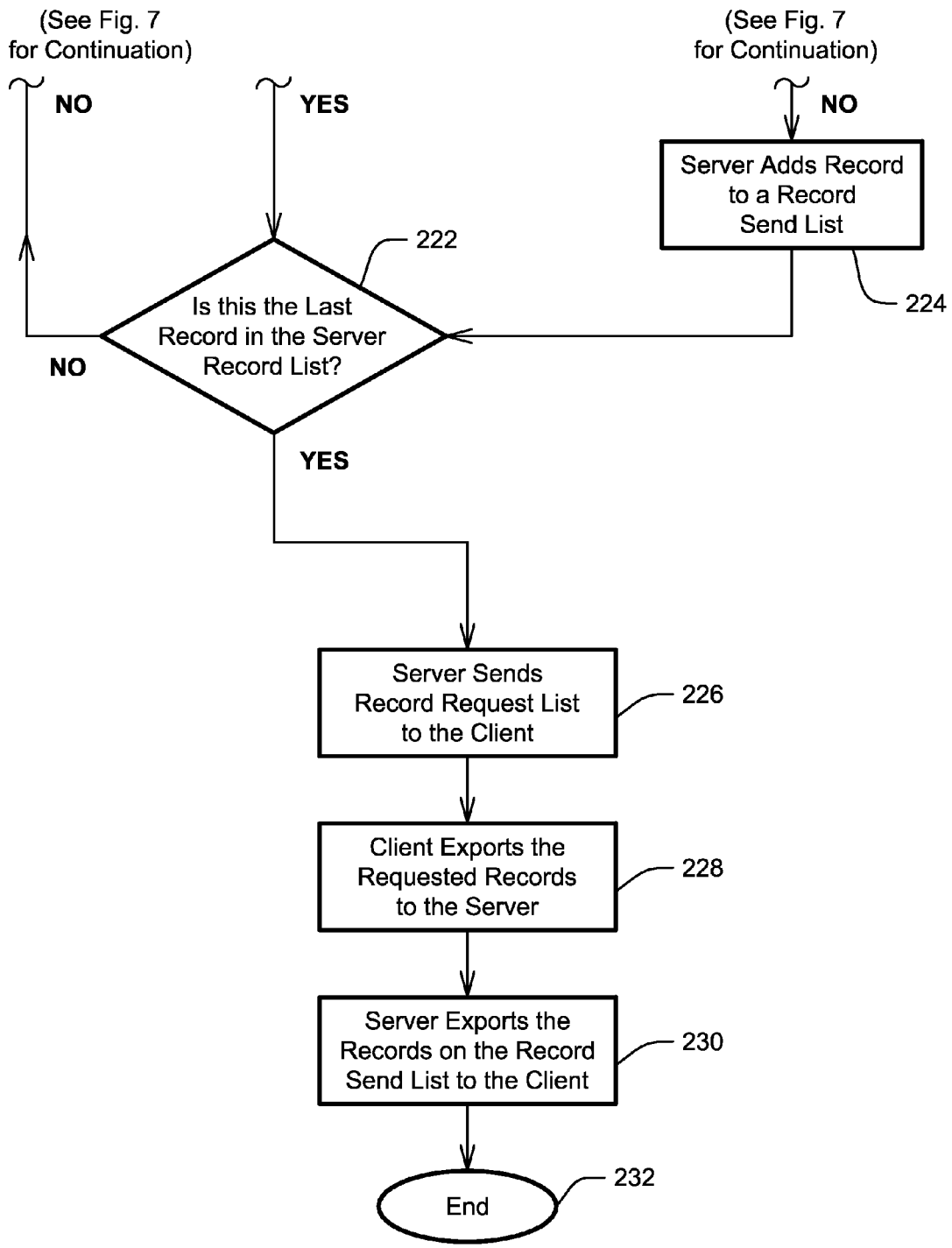
FIG. 8 is a continuation of the flowchart of FIG. 7, which illustrates additional steps of the two-way merge procedure, according to an embodiment of the invention.

In accordance with an embodiment of the invention, a flowchart illustrating a two-way merge procedure carried out by the computer system 50 of FIG. 1 is set forth in FIGS. 6-8. Referring initially to FIG. 6, the procedure commences at 200, and in step 202, the client computing device 10 ("client") connects to the server computing device 20 ("server") via a network connection 30. In a preferred embodiment, the network connection 30 between the client computing device 10 and the server computing device 20 is encrypted so that the data can be securely transmitted between the computing devices 10, 20. For example, a secure connection in the form of a standard Hypertext Transfer Protocol Secure (HTTPS) can be used. This permits the computer system 50 to securely transmit data both within a local internet and the world-wide Internet. As such, confidential or proprietary data can be safely transmitted between the computing devices 10, 20 without the fear of interception by an unauthorized third party.

Initially, in step 203, the client computing device 10 prepares a list of all database tables, unique record identifiers (i.e., GUIDs), and timestamps (i.e., last modification times), with no other data. If the content of the client database 18 was never previously seen by the server computing device 20, the client list will contain all of the record identifiers (i.e., GUIDs), and timestamps (i.e., last modification times) for all records in the client database 18. In one embodiment of the invention, as a performance enhancement feature, if the content of the client database 18 was previously seen by the server computing device 20 within some particular window of time, the client list may be trimmed so as to remove record identifiers and timestamps that have not changed in the last timeframe. Although, because the file size of the list itself is very small, and because it is further compressed with data compression techniques, this performance enhancement feature is not used in all embodiments of the invention.

The client list is generated by selecting each row of table data from the client database 18, and recording only the unique identifiers (i.e., GUIDs) and the timestamps (i.e., last modification times); no other field data is recorded or transformed. Once the client list is constructed, it is compressed and encrypted with additional error recovery checksum logic.

Then, after the client list has been generated and a network connection has been established between the client and the server, the client sends a list of globally unique identifiers (GUIDs) and timestamps, which correspond to the records in its database (i.e., the client database 18), to the server in step 204 of FIG. 6. Upon receipt of the client list, the server decrypts the list and decompresses it, using the error recovery logic if needed, and verifying the checksums. Then, in step 206, the server reads and compares the listing of globally unique identifiers (GUIDs) sent from the client to the listing of globally unique identifiers (GUIDs) in its own database (i.e., server database 28).

In step 208 (i.e., decision block 208), the server initially determines whether a GUID identifying a particular record in the client database 18 exists in the server database 28. When it is determined that a GUID identifying a particular record in the client database 18 does not exist in the server database 28, the server adds that record to a record request list (step 212 in FIG. 7). After which, in step 218, the server determines if the record added to the record request list is the last record in the client record list (i.e. the list of records residing in the client database 18). If the record added to the record request list is the last record in the client record list, the process proceeds to step 220 in FIG. 7. Otherwise, the determination in step 208 is performed for the next record in the client record list.

When it is determined that a GUID identifying a particular record in the client database 18 also exists in the server database 28, the server further compares in step 209, the timestamp of the record in the client database 18 to the timestamp of the corresponding record in the server database 28 (e.g., the timestamps expressed in Julian dates). Then, in step 210, by means of the timestamp comparison, the server determines whether the record in the client database 18 was updated more recently than the corresponding record in the server database 28. The version of the record having the most recent timestamp associated therewith (e.g., the greatest Julian date value) is deemed to be the record that was most recently updated. When it is determined that the version of the record in the client database 18 has a more recent timestamp, and thus was updated more recently, than the version of the record in the server database 28, the server adds that record to the record request list (step 214 in FIG. 7). After which, in step 218 of FIG. 7, the server determines if the record added to the record request list is the last record in the client record list. If the added record is the last record in the client record list, the process proceeds to step 220 in FIG. 7. Otherwise, the initial determination in step 208 is performed for the next record in the client record list.

On the other hand, when it is determined that the version of the record in the client database 18 has an older timestamp as compared to the version of the record in the server database 28 (at decision block 210), the process proceeds to step 216 in FIG. 7, wherein the server adds the record to a record send list. Then, in step 218 of FIG. 7, the server determines if the record added to the record send list is the last record in the client record list. If the record added to the record send list is the last record in the client record list, the process proceeds to step 220 in FIG. 7. If not, the initial determination in step 208 is carried out for the next record in the client record list. The aforedescribed process is performed by the server until each of the records in the client record list is evaluated.

In one or more embodiments, as described above, the timestamps of the records having common unique identifiers (i.e., the same GUIDs) are compared only once during the two-way merge procedure (i.e., in step 209) so as to result in an efficient and streamlined process. In other words, only one comparison of timestamps for a particular pair of records having matching unique identifiers (i.e., GUIDs) is performed during the two-way merge process. Also, in one or more embodiments of the merge processes disclosed herein, no determination is made as to whether two timestamps are equal to one another (i.e., no determination is made as to whether timestamps of records having common unique identifiers match one another).

After all of the records in the client record list have been evaluated by the server as explained above, the server proceeds with step 220 in FIG. 7. In step 220, the server further determines whether a GUID identifying a particular record in the server database 28 exists in the client database 18. When it is determined that a GUID identifying a particular record in the server database 28 does not exist in the client database 18, the server adds that record to the record send list (step 224 in FIG. 8). After which, in step 222, the server determines if the record added to the record send list is the last record in the server record list (i.e., the list of records residing in the server database 28). If the record added to the record send list is the last record in the server record list, the process proceeds to step 226 in FIG. 8. Otherwise, the determination in step 220 is performed for the next record in the server record list.

In step 220, when it is determined that a GUID identifying a particular record in the server database 28 also exists in the client database 18, the server proceeds with step 222 in FIG. 8, wherein the server determines if the record existing in both databases 18, 28 is the last record in the server record list. If the record existing in both databases 18, 28 is the last record in the server record list, the process proceeds to step 226 in FIG. 8. If not, the determination in step 220 is performed for the next record in the server record list.

After all of the records in the server record list have been evaluated by the server, the server sends the record request list to the client in step 226 of FIG. 8. Subsequently, in step 228, the client exports the requested records (i.e., an exported subset of the client database 18) to the server utilizing the network connection 30. Then, the server exports the records on the record send list (i.e., an exported subset of the server database 28) to the client in step 230 of FIG. 8 also using the network connection 30. In a preferred embodiment of the invention, the entire records are exported by both the server and the client in steps 228 and 230, rather than portions of those records. Advantageously, the exportation of the entire records, rather than just mere portions thereof, obviates the need to determine the changed content of each record thereby resulting in a simpler and more streamlined process. Once all of the designated records have been exported from the client to the server, and all of the designated records have been exported from the server to the client, the process ends at step 232.

Figure 11:
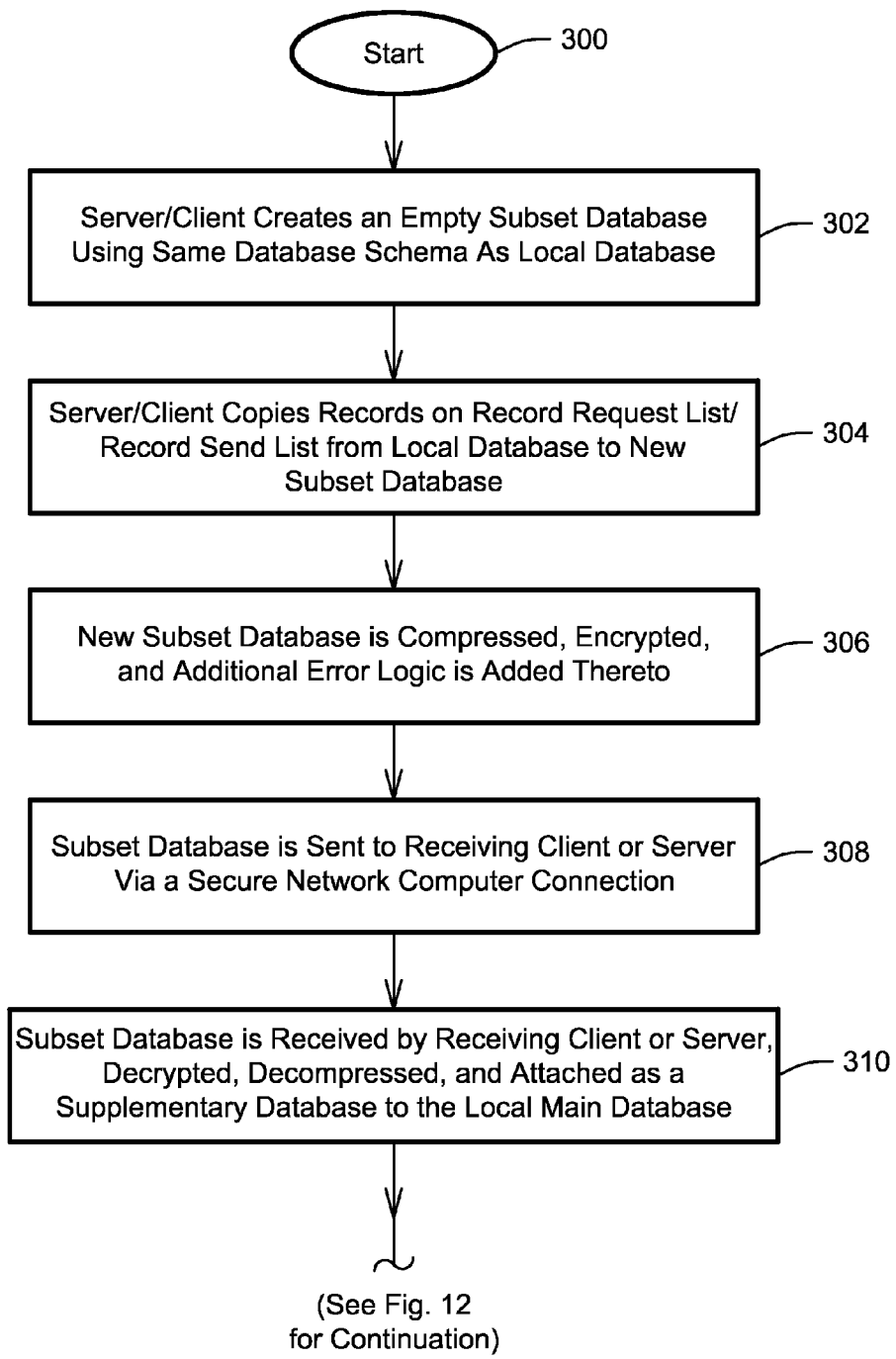
FIG. 11 is a flowchart illustrating exported database subset generation and incorporation of the database subset into the recipient database carried out during the two-way merge procedure.

In one embodiment of the invention, with reference to FIG. 11, the exported subset generation for both databases 18, 28 is performed by initially creating an empty local subset database using the same database schema as the local database 18 or 28 (in step 302, after the process has commenced at 300). This advantageously ensures that the table structures are the same. Then, using the unique record identifiers (GUIDs) for each of the items (i.e., the list sent to the client—record request list, or the internal list generated and kept by the server—record send list), the computing device 10, 20 copies the record from the main local database (18 or 28) into the new subset database (step 304). When the record is copied into the new subset database, all fields in the record are copied without regard to the field content or types. Once all of the records from either the record request list or the record send list have been copied, this new subset database is then compressed, encrypted, and has additional error logic added thereto (i.e., the same as for the lists that were sent between the computing devices 10, 20) in step 306. After which, in step 308, the subset database is sent to the receiving client or server via a secure network computer connection (e.g., Hypertext Transfer Protocol Secure (HTTPS)). Then, in step 310, once the database subset has been received by the other computing device (10 or 20), it is decrypted and decompressed, and then attached to the local main database (18 or 28) as a supplementary database thereto (e.g., the "OtherDatabase").

Figure 12:
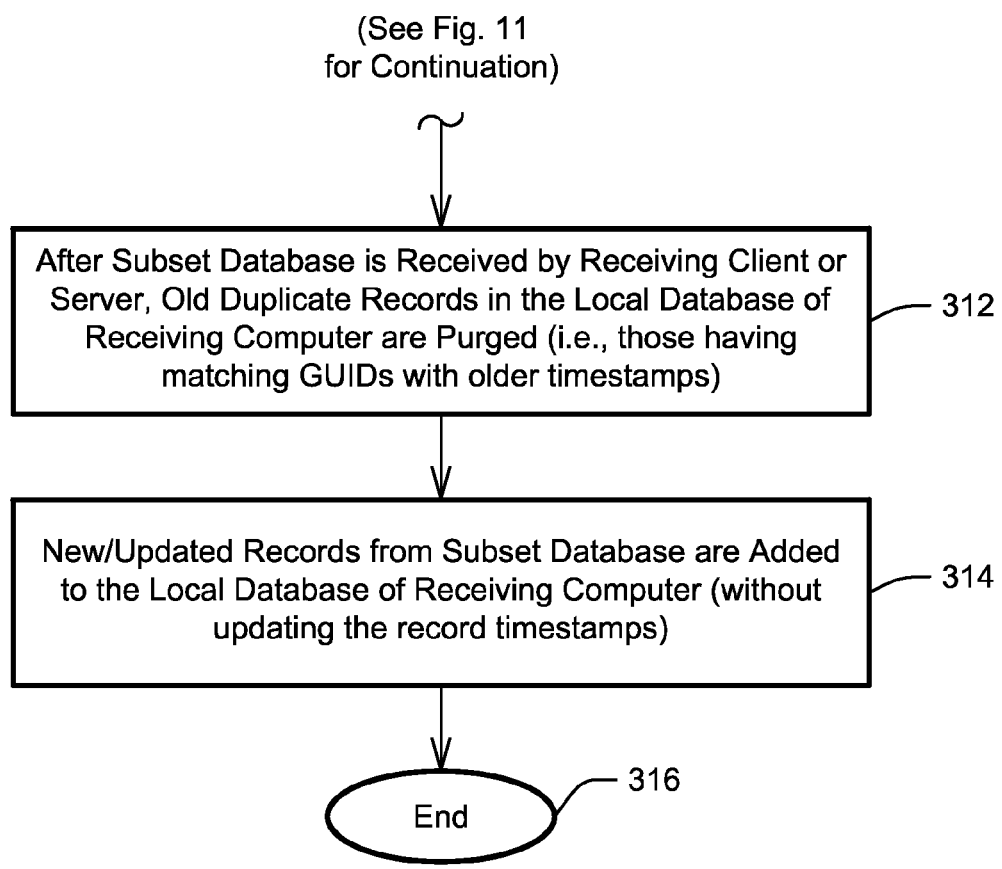
FIG. 12 is a continuation of the flowchart of FIG. 11, which illustrates additional steps of the exported database subset generation and incorporation of the database subset into the recipient database carried out during the two-way merge procedure.

Turning to FIG. 12, after the database subset has been received by the other computing device (10 or 20), the old duplicate records in the database residing on that computing device (10 or 20) are initially purged in step 312 using, for example, the following programming logic:

for each record OTHER in OTHERDATABASE table
  tablename
and
for each record TARGET in TARGETDATABASE table
  tablename
  where record TARGET
    has TARGET record field record_id=OTHER record
    field
    record_id
  and
  OTHER record field modification_time is greater than
    TARGET
  record field modification_time
  then
    DELETE record TARGET from TARGETDATABASE
    table tablename
  end where
end for each TARGET
end for each OTHER The above lines of exemplary code delete all records from the target database 18 or 28 ("TARGETDATABASE") that have the same unique record identifier (i.e., GUID) as a record in the database subset ("OTHERDATABASE") and have a modification time (i.e., Julian date) that is older than the record with the matching record identifier in the target database 18 or 28. Then, after the old duplicate records have been removed from the target database, the new/updated records from the database subset are added to the target database in step 314 using, for example, the following programming logic:

for each record OTHER in OTHERDATABASE table
  tablename
  where record OTHER
    has OTHER record field record_id that does not appear
    in
    TARGET record field record_id
  then
    create new record in TARGETDATABASE table
      tablename using
    each OTHER record field values with restriction of do
      not
    update TARGET record field modification time
  end where
end for each OTHER The lines of exemplary code set forth above create new records in the target database 18 or 28 ("TARGETDATABASE") for any records of the database subset ("OTHERDATABASE") having a unique record identifier (i.e., GUID) that is not already included in the target database 18 or 28. The content of the newly created records in the target database 18 or 28 is based upon the content of the corresponding records in the database subset. The modification time (i.e., the timestamp) of each record inserted into the target database 18 or 28 from the database subset remains unchanged (i.e., it is not updated). Once all of the records have inserted into each of the target databases 18, 28, the two-way merge process is complete (at step 316 of FIG. 12).

In a further embodiment, the one-way and two-way merge procedures described hereinbefore are user-forced operations. That is, the one-way and two-way merge procedures are initiated by a user (e.g., the user can implement the one-way merge procedure by selecting a "one-way merge" option in the software program, or alternatively, the two-way merge procedure by selecting a "two-way merge" option in the program). In this further embodiment, there is no background initiation action by the software program itself.

Also, in this further embodiment, at least one of the computing devices (i.e., at least one of the client computing device 10 and the server computing device 20) is additionally programmed to enable a system user to selectively choose between one of the following two operational modes: (i) a one-way merge mode, wherein the first database is merged with the second database by utilizing a data transfer device configured to make a copy of the first database available to the second computing device; and (ii) a two-way merge mode, wherein the first and second databases are merged with one another by utilizing the network connection operatively connecting the first and second computing devices to each other.

Moreover, in one or more further embodiments, a user of a particular computing device (i.e., a user of the client computing device 10 or the server computing device 20) must enable access to his or her computing device. In particular, the computing device (e.g., 10 or 20) is specially programmed to prompt a user to enable or disable access to his or her computing device by others for performing a two-way merge. Thus, unless a user explicitly enables access to his or her computing device (e.g., by checking a box in the software program) via a local network, other users will be unable to gain access to his or her computing device (e.g., 10 or 20) for the purpose of performing a two-way merge. Advantageously, this feature prevents unauthorized access to the user's computing device, thereby protecting the confidentiality of the data residing thereon. In one or more embodiments of the invention, when a user initiates a two-merge procedure, he or she will be prompted to select from a list of accessible databases residing on one or more remote computing devices (i.e., all of these other users have granted the user initiating the two-way merge access to their computing devices). Then, after having been presented with this list, the user initiating the two-way merge is able to select which of the databases from the list are to be merged with the database residing on his or her computing device (e.g., by checking a box next to the database with which the merge is to be performed). If a user in the local network has not granted access to his or computing device (e.g., 10 or 20) for the purpose of performing two-way merges, then the database residing on his or her computing device will not appear in the list. Once, the user initiating the two-way merge selects the desired databases, with which a two-way merge is to be performed, the steps of the two-way merge procedure described above are performed.

In still a further embodiment of the invention, one of the computing devices listed in the two-way merge list is a cloud-based, remote computing device. For example, a user of the two-way merge software program may be given an option to subscribe to a cloud-based server. When the user of the two-way merge software program has a such a subscription, the cloud-based server will automatically appear in the list of accessible databases, with which a two-way merge is capable of being performed.

In yet a further embodiment, the user is prompted to initiate the two-way merge process. In one particular exemplary embodiment, the user is prompted to initiate the two-way merge process after he or she performs a series of tasks using the computing device (10 or 20). For example, the user could be using the client computing device 10 in order to perform a series of tests (e.g., subject tests using an measurement instrument operatively coupled to the client computing device 10), and record the acquired test data in the client database 18 residing on the client computing device 10. At the conclusion of the final test in the test series of this exemplary embodiment, the user is prompted (e.g., by a dialogue box on the output screen 12) to determine whether he or she wishes to perform the two-way merge process. If the user elects to perform the two-way merge process, then the new and updated records on the client computing device 10 are merged with the records residing on the server computing device 20.

In one or more alternative embodiments, the two-way merge is performed automatically on a scheduled basis. For example, a particular computing device (i.e., the client computing device 10 or the server computing device 20) is specially programmed to automatically perform a scheduled two-way merge with another computing device (e.g., with a cloud-based, remote computing device) after a predetermined period of time has elapsed (e.g., every twenty-four (24) hours or at the end of each workday).

Alternatively, or in addition to being performed on a scheduled basis, the two-way merge could be performed as a result of a certain event trigger. For example, if the databases 18, 28 were being used to store data from a series of experimental tests (e.g., subject tests) being performed by an operator using the computing devices 10, 20, the conclusion of a particular test in the test series could automatically trigger the start of the two-way merge process. In one such example, the operator/user might be performing a first series of tests using the client computing device 10. The test results from the first series of tests together with subject (patient) information manually entered by the operator/user would then be stored in the client database 18. After which, the operator/user performs a second series of tests using the server computing device 20, and test results are stored in the server database 28. In this scenario, when the operator/user switches to the server computing device 20 to perform the second series of tests, the two-way merge process is performed automatically at the conclusion of the last test in the first test series. As a result, the new and/or updated records entered into the client database 18 during the first testing series are automatically transferred to the server database 28 residing on the server computing device 20 prior to the commencement of the second test series. Preferably, the two-way merge process is performed in a quasi-instantaneous manner so that the new and/or updated records are available to the operator/user as soon as he or she transfers to the server computing device 20 (i.e., the duration of the two-way merge process is approximately equal to, or less than the time that it takes for the operator/user to transfer to the server computing device 20). Therefore, advantageously, the operator/user would not have to reenter the same subject (patient) information in the server computing device 20, and the test results from the first testing series would be available at the server computing device 20, as well as at the client computing device 10. While the event trigger in this particular example is the conclusion of a particular test in a test series, it is to be understood that other events could be used to trigger the automatic two-way merge process. In addition, a similar event trigger could be used in conjunction with the one-way merge process as well.

4. Example of a One-Way Merge Application

Figure 9:
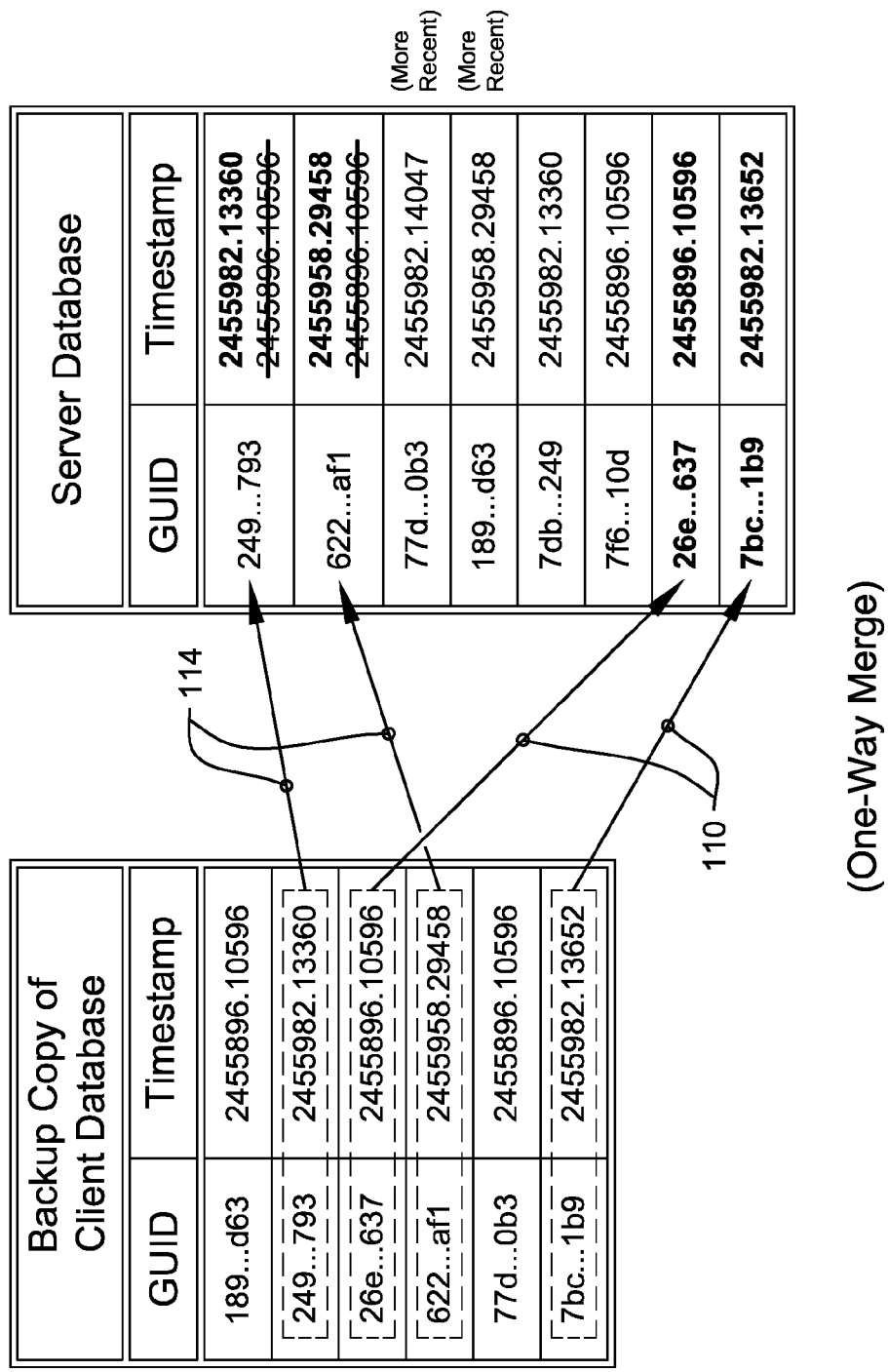
FIG. 9 illustrates an example of the one-way merge procedure for a sample list of records.

FIG. 9 illustrates an example of a one-way merge application carried out by an embodiment of the present invention. In order to facilitate the explanation of the merge processes described herein, the middle characters of the record GUID numbers have been omitted (as indicated by the use of the ellipses) to shorten the overall length of these numbers. However, it is to be understood that the actual GUID numbers used in the database merging system will have a total of 32 characters. Turning to this figure, it is initially determined that the first record in the client database, identified by GUID number "189 . . . d63", also appears in the server database (step 106 in FIG. 4). However, because it is further determined that the version of record number "189 . . . d63" in the backup copy of the client database was not updated more recently than the corresponding record in the server database (step 108 in FIG. 4), the record is not copied to the server database. The most recent version of record number "189 . . . d63" is determined by comparing the Julian date of the record in the client database to the Julian date of the associated record in the server database. In this case, the copy of record number "189 . . . d63" in the client database has a Julian date of "2455896.10596" (corresponding to Wednesday, Nov. 30, 2011 at 14:32:34.9 UT), whereas the copy of the record in the server database has a Julian date of "2455958.29458" (corresponding to Tuesday, Jan. 31, 2012 at 19:04:11.7 UT). Thus, the copy of the record in the server database is more recent than the copy of the record in the client database, so the record is not copied to the server database.

Next, turning to the second record in the client database, which is identified by GUID number "249 . . . 793", it is also determined that a copy of this record additionally appears in the server database (step 106 in FIG. 4). Thus, it is further determined if the backup copy of this record in the client database was updated more recently than the copy in the server database (step 108 in FIG. 4). Unlike the previous record, a comparison of the Julian dates associated with the two versions of record number "249 . . . 793" reveals that the version of the record in the backup copy of the client database was updated more recently (i.e., Julian date "2455982.13360" corresponds to Friday, Feb. 24, 2012 at 15:12:23.0 UT, while Julian date "2455896.10596" corresponds to Wednesday, Nov. 30, 2011 at 14:32:34.9 UT). Consequently, the server copies record number "249 . . . 793" from the backup copy of the client database to the server database (step 114 in FIG. 5), and overwrites the older version of record number "249 . . . 793" in the server database (as indicated by the line through the old timestamp "2455896.10596" in FIG. 9 and the addition of new timestamp "2455982.13360" thereabove).

The fourth record in the client database, which is denoted by GUID number "622 . . . af1" is treated in the same manner as record number "249 . . . 793" because the backup copy of the client database also contains a more recent version of this record (i.e., Julian date "2455958.29458" corresponds to Tuesday, Jan. 31, 2012 at 19:04:11.7 UT, while Julian date "2455896.10596" corresponds to Wednesday, Nov. 30, 2011 at 14:32:34.9 UT). Therefore, as described for record number "249 . . . 793", the server copies record number "622 . . . af1" from the backup copy of the client database to the server database (step 114 in FIG. 5), and overwrites the older version of record number "622 . . . af1" in the server database (as indicated by the line through the old timestamp "2455896.10596" in FIG. 9 and the addition of new timestamp "2455958.29458" thereabove).

Referring again to FIG. 9, it is determined that the third record in the client database, which is denoted by GUID number "26e . . . 637" does not exist at all in the server database (step 106 in FIG. 4). Consequently, the server copies record number "26e . . . 637" from the backup copy of the client database to the server database (step 110 in FIG. 4). Because the sixth record in the client database, namely record number "7bc . . . 1b9", also does not exist in the server database, the server additionally copies this record from the backup copy of the client database to the server database (step 110 in FIG. 4).

Like the first record described above, it is determined that the fifth record in the client database, which is identified by GUID number "77d . . . 0b3", also appears in the server database (step 106 in FIG. 4). As such, it is further determined if the backup copy of this record in the client database was updated more recently than the copy in the server database (step 108 in FIG. 4). In this case, a comparison of the Julian dates associated with the two versions of record number "77d . . . 0b3" reveals that the version of the record in the backup copy of the client database was not updated more recently than the version in the server database (i.e., Julian date "2455896.10596" in the client database corresponds to Wednesday, Nov. 30, 2011 at 14:32:34.9 UT, while Julian date "2455982.14047" in the server database corresponds to Friday, Feb. 24, 2012 at 15:22:16.6 UT). Therefore, as for the first record described above, the version of the record from the backup copy of the client database is not copied to the server database.

5. Example of a Two-Way Merge Application

Figure 10:
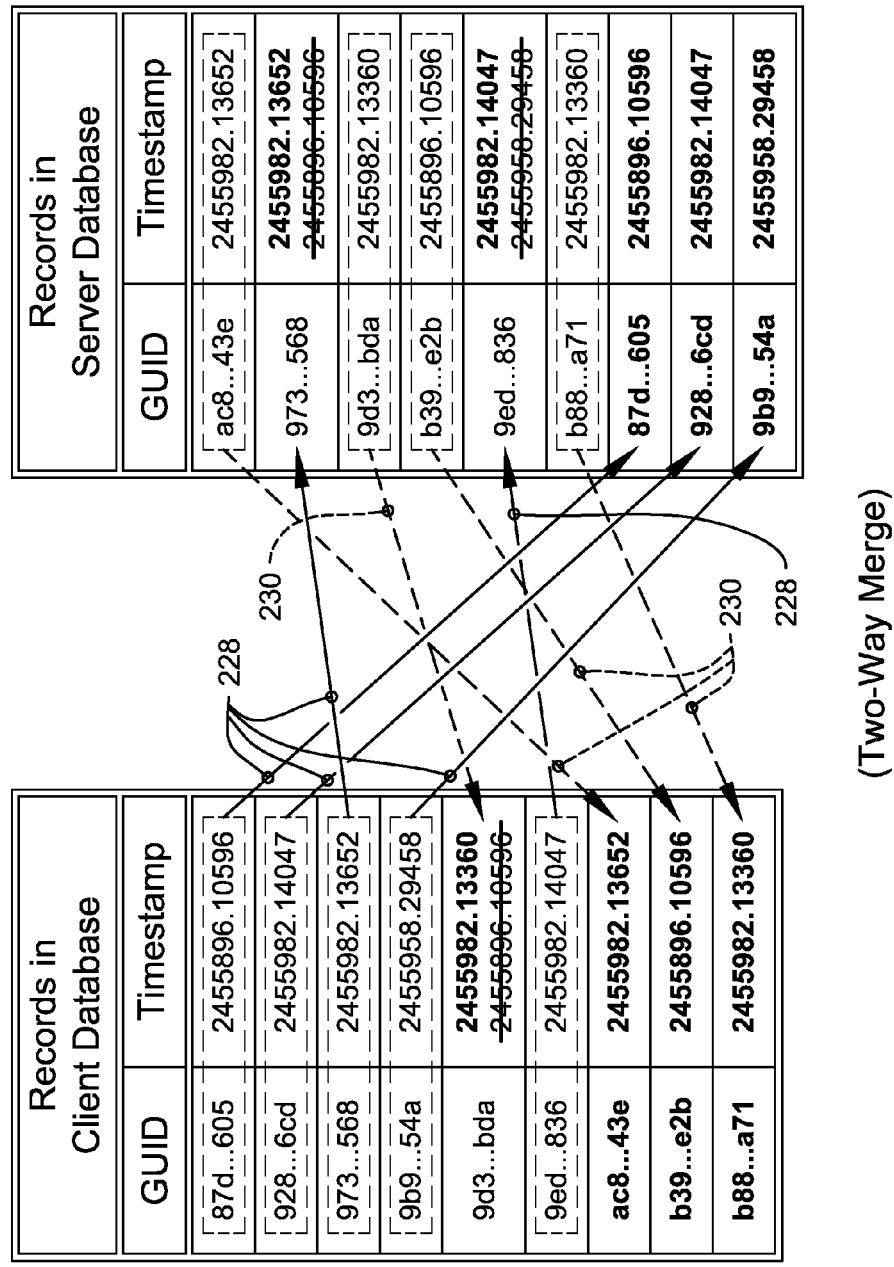
FIG. 10 illustrates an example of the two-way merge procedure for a sample list of records.

FIG. 10 illustrates an example of a two-way merge application carried out by an embodiment of the present invention. Turning to this figure, it is initially determined that the first record in the client database, identified by GUID number "87d . . . 605", does not exist at all in the server database (step 208 in FIG. 6). Consequently, the server adds record number "87d . . . 605" to a record request list (step 212 in FIG. 7), and record number "87d . . . 605" is subsequently exported by the client to the server (in step 228 of FIG. 8) after the client receives the record request list from the server. Because the second and fourth records in the client database, identified by GUID numbers "928 . . . 6cd" and "9b9 . . . 54a" respectively, also do not exist in the server database, the server additionally adds record numbers "928 . . . 6cd" and "9b9 . . . 54a" to the record request list (step 212 in FIG. 7). Then, like record number "87d . . . 605", record numbers "928 . . . 6cd" and "9b9 . . . 54a" are subsequently exported by the client to the server (in step 228 of FIG. 8) after the client receives the record request list from the server.

Next, turning to the third record in the client database, which is identified by GUID number "973 . . . 568", it is determined that a version of this record additionally appears in the server database (step 208 in FIG. 6). Thus, it is further determined if the version of this record in the client database was updated more recently than the version in the server database (step 210 in FIG. 7). The most recent version of record number "973 . . . 568" is determined by comparing the Julian date of the record in the client database to the Julian date of the associated record in the server database. In this case, the version of record number "973 . . . 568" in the client database has a Julian date of "2455982.13652" (corresponding to Friday, Feb. 24, 2012 at 15:16:35.3 UT), whereas the version of this record in the server database has a Julian date of "2455896.10596" (corresponding to Wednesday, Nov. 30, 2011 at 14:32:34.9 UT). Therefore, because the version of the record in the client database is more recent than the version of the record in the server database, the server adds record number "973 . . . 568" to the record request list (step 214 in FIG. 7), and it is subsequently exported by the client to the server (in step 228 of FIG. 8) after the client receives the record request list from the server. After which, the outdated version of the record number "973 . . . 568" on the server is overwritten with the new version of the record from the client database (as indicated by the line through the old timestamp "2455896.10596" in FIG. 10 and the addition of new timestamp "2455982.13652" thereabove). Like record number "973 . . . 568", a version of the sixth record in the client database, which is identified by GUID number "9ed . . . 836", also appears in the server database. As such, it is further determined if the version of this record in the client database was updated more recently than the version in the server database (step 210 in FIG. 7). Similar to record number "973 . . . 568", a comparison of the Julian dates associated with the two versions of record number 9ed . . . 836" reveals that the version of the record in the client database is more recent (i.e., Julian date "2455982.14047" in the client database corresponds to Friday, Feb. 24, 2012 at 15:22:16.6 UT, while Julian date "2455958.29458" in the server database corresponds to Tuesday, Jan. 31, 2012 at 19:04:11.7 UT, signifying that the version of the record in the client database is more recent). Thus, because the version of the record in the client database is more recent than the version of the record in the server database, the server adds record number "9ed . . . 836" to the record request list (step 214 in FIG. 7), and it is subsequently exported by the client to the server (in step 228 of FIG. 8) after the client receives the record request list from the server. The old version of the record number "9ed . . . 836" on the server is overwritten with the new version of the record from the client database (as indicated by the line through the old timestamp "2455958.29458" in FIG. 10 and the addition of new timestamp "2455982.14047" thereabove).

Now, turning to the fifth record in the client database, which is identified by GUID number "9d3 . . . bda", it is determined that a version of this record additionally appears in the server database (step 208 in FIG. 6). Thus, it is further determined if the version of this record in the client database was updated more recently than the version in the server database (step 210 in FIG. 7). In this case, the version of record number "9d3 . . . bda" in the client database has a Julian date of "2455896.10596" (corresponding to Wednesday, Nov. 30, 2011 at 14:32:34.9 UT), whereas the version of this record in the server database has a Julian date of "2455982.13360" (corresponding to Friday, Feb. 24, 2012 at 15:12:23.0 UT). Therefore, because the version of the record in the client database is not more recent than the version of the record in the server database, the server adds record number "9d3 . . . bda" to the record send list (step 216 in FIG. 7), and it is subsequently exported by the server to the client (in step 230 of FIG. 8). After which, the outdated version of the record number "9d3 . . . bda" on the client is overwritten with the new version of the record from the server database (as indicated by the line through the old timestamp "2455896.10596" in FIG. 10 and the addition of new timestamp "2455982.13360" thereabove).

Finally, turning to the server database in FIG. 10, it is initially determined that the first record in the server database, identified by GUID number "ac8 . . . 43e", does not exist at all in the client database (step 220 in FIG. 7). Consequently, the server adds record number "ac8 . . . 43e" to a record send list (step 224 in FIG. 8), and record number "ac8 . . . 43e" is subsequently exported by the server to the client (in step 230 of FIG. 8). Because the fourth and sixth records in the server database, identified by GUID numbers "b39 . . . e2b" and "b88 . . . a71" respectively, also do not exist in the client database, the server additionally adds record numbers "b39 . . . e2b" and "b88 . . . a71" to the record send list (step 224 in FIG. 8). Then, like record number "ac8 . . . 43e", record numbers "b39 . . . e2b" and "b88 . . . a71" are subsequently exported by the server to the client (in step 230 of FIG. 8).

Advantageously, the system and method for the merging of databases described herein is not concerned with the inherent clock drift that is experienced by computing devices. Considering that virtually all modern computing systems automatically synchronize their own clocks, any residual clock drift after synchronization will be so miniscule in nature that it will have no appreciable effect on the merging of the database records explained hereinbefore. Thus, the present invention can be employed on computing systems which use standard methods to automatically synchronize their clocks. Moreover, the system and method for the merging of databases described herein advantageously does not require the use of a transaction, activity, or history log in a separate file, which would undesirably add to the overall complexity of the merging procedure. Because the system and method for the merging of databases disclosed herein is not concerned with determining the changed content of records, it does not determine or evaluate the modification status of any records. Furthermore, advantageously the system and method for the merging of databases hereinbefore explained does not rely upon any centralized database, nor does it employ any type of scripting or business logic. The present system for the merging of databases always operates in a synchronous mode, and utilizes single peer-to-peer communication without the need for any type of master server device. Also, while the merge processes are being carried out, the updating of the data in the client database 18 and the server database 28 is not permitted.

In addition, the aforedescribed system and method for the merging of databases provides a great deal of flexibility in the connectivity of the computer system, wherein individual computers in the system can be connected on an ad hoc basis to merge the database results when needed, with no requirements for the availability of a continual network connection.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A method for merging a first database with a second database, the method comprising the steps of:
providing first and second computing devices having respective first and second databases stored thereon, the first and second databases each comprising one or more records containing data, each of the one or more records having a unique identifier and a timestamp associated therewith;
utilizing the first computing device for making a backup copy of the first database, the first computing device storing the backup copy of the first database on a form of electronic media or a shared device;
making the backup copy of the first database stored on the electronic media or the shared device available to the second computing device so that the second computing device is capable of reading the first database;
attaching the backup copy of the first database to the second database as a supplementary database thereto;
comparing, by using the second computing device, a first listing comprising one or more unique identifiers associated with the one or more records in the first database to a second listing comprising one or more unique identifiers associated with the one or more records in the second database without performing any type of conflict detection or determination for the data in the one or more records;
determining, by using the second computing device, whether each of the one or more unique identifiers in the first listing exists in the second listing;
when it is determined that one or more unique identifiers in the first listing do not exist in the second listing, copying one or more records associated with the one or more unique identifiers that do not exist from the first database to the second database;
when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure;
when it is determined that one or more records in the first listing have a more recent timestamp than one or more corresponding records in the second listing with matching unique identifiers, copying the one or more records having more recent timestamps from the first database to the second database without first checking the data in the one or more records for conflicts and without making any determination as to whether or not a conflict exists in the data; and
making no determination during the merge procedure as to whether any of the one or more timestamps of the one or more records in the first database is equal to any of the one or more timestamps of the one or more records in the second database.

2. The method according to claim 1, wherein the one or more unique identifiers comprise one or more globally unique identifiers.

3. The method according to claim 2, wherein the one or more globally unique identifiers are expressed in a numerical or alpha-numerical notation for encoding binary data.

4. The method according to claim 2, wherein the one or more globally unique identifiers comprise one of the following: (i) one or more mathematically random numbers, (ii) one or more mathematically pseudo-random numbers, and (iii) one or more heuristic values based upon content of one or more fields of the one or more records in one or more tables.

5. The method according to claim 1, wherein the one or more timestamps are expressed in the form of Julian dates.

6. The method according to claim 1, wherein the first computing device is a client computing device and the second computing device is a server computing device.

7. A method for merging two databases with one another, the method comprising the steps of:
providing first and second computing devices having respective first and second databases stored thereon, the first and second databases each comprising one or more records containing data, each of the one or more records having a unique identifier and timestamp associated therewith;
connecting the first computing device with the second computing device by utilizing a network connection;
preparing, by using the first computing device, a first listing of one or more unique identifiers and timestamps associated with the one or more records in the first database by selecting each row of table data from the first database and recording only the one or more unique identifiers and timestamps without any other data;

sending the first listing of the one or more unique identifiers and timestamps associated with the one or more records in the first database from the first computing device to the second computing device;

comparing, by using the second computing device, the first listing comprising the one or more unique identifiers associated with the one or more records in the first database to a second listing comprising one or more unique identifiers associated with the one or more records in the second database without performing any type of conflict detection or determination for the data in the one or more records;

determining, by using the second computing device, whether each of the one or more unique identifiers in the first listing exists in the second listing, and whether each of the one or more unique identifiers in the second listing exists in the first listing;

when it is determined that one or more unique identifiers in the first listing do not exist in the second listing, adding one or more records associated with the one or more unique identifiers that do not exist to a record request list;

when it is determined that one or more unique identifiers in the first listing also exist in the second listing, further determining, by using the second computing device, a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure;

when it is determined that one or more records in the first listing have a more recent timestamp than one or more corresponding records in the second listing with matching unique identifiers, adding the one or more records having more recent timestamps to the record request list without first checking the data in the one or more records for conflicts and without making any determination as to whether or not a conflict exists in the data;

when it is determined that one or more records in the second listing have a more recent timestamp than one or more corresponding records in the first listing with matching unique identifiers, adding the one or more records having more recent timestamps to a record send list without first checking the data in the one or more records for conflicts and without making any determination as to whether or not a conflict exists in the data;

when it is determined that one or more unique identifiers in the second listing do not exist in the first listing, adding one or more records associated with the one or more unique identifiers that do not exist to the record send list;

making no determination during the merge procedure as to whether any of the one or more timestamps of the one or more records in the first database is equal to any of the one or more timestamps of the one or more records in the second database;

transferring the record request list from the second computing device to the first computing device;

exporting the one or more records listed on the record request list from the first computing device to the second computing device; and exporting the one or more records listed on the record send list from the second computing device to the first computing device.

8. The method according to claim 7, wherein the one or more unique identifiers comprise one or more globally unique identifiers.

9. The method according to claim 8, wherein the one or more globally unique identifiers are expressed in a numerical or alpha-numerical notation for encoding binary data.

10. The method according to claim 8, wherein the one or more globally unique identifiers comprise one of the following: (i) one or more mathematically random numbers, (ii) one or more mathematically pseudo-random numbers, and (iii) one or more heuristic values based upon content of one or more fields of the one or more records in one or more tables.

11. The method according to claim 7, wherein the one or more timestamps are expressed in the form of Julian dates.

12. The method according to claim 7, wherein the first computing device is a client computing device and the second computing device is a server computing device.

13. The method according to claim 7, wherein the network connection is an encrypted network connection.

14. The method according to claim 7, further comprising the steps:

creating, by using the first computing device, a first subset database using a same database schema as the first database, and populating the first subset database with the one or more records listed on the record request list prior to exporting the one or more records listed on the record request list from the first computing device to the second computing device; and creating, by using the second computing device, a second subset database using a same database schema as the second database, and populating the second subset database with the one or more records listed on the record send list prior to exporting the one or more records listed on the record send list from the second computing device to the first computing device.

15. A system for merging a first database with a second database, the system comprising:

first and second computing devices, each of the first and second computing devices including a microprocessor and memory, the first and second computing devices having respective first and second databases stored thereon, the first and second databases each comprising one or more records containing data, each of the one or more records having a unique identifier and timestamp associated therewith, the first computing device configured to make a backup copy of the first database by storing the backup copy of the first database on a data transfer device;

the data transfer device configured to make the backup copy of the first database available to the second computing device so that the second computing device is capable of reading the first database, the data transfer device being a form of electronic media or a shared device;

the second computing device being specially programmed to:

attach the backup copy of the first database to the second database as a supplementary database thereto;

compare a first listing comprising one or more unique identifiers associated with the one or more records in the first database to a second listing comprising one or more unique identifiers associated with the one or more records in the second database without performing any type of conflict detection or determination for the data in the one or more records;

determine whether each of the one or more unique identifiers in the first listing exists in the second listing;

when it is determined that one or more unique identifiers in the first listing do not exist in the second listing, copy one or more records associated with the one or more unique identifiers that do not exist from the first database to the second database;

when it is determined that one or more unique identifiers in the first listing also exist in the second listing, further determine a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure;

when it is determined that one or more records in the first listing have a more recent timestamp than one or more corresponding records in the second listing with matching unique identifiers, copy the one or more records having more recent timestamps from the first database to the second database without first checking the data in the one or more records for conflicts and without making any determination as to whether or not a conflict exists in the data; and wherein no determination is made during the merge procedure as to whether any of the one or more timestamps of the one or more records in the first database is equal to any of the one or more timestamps of the one or more records in the second database.

16. The system according to claim 15, wherein the second computing device is additionally programmed to enable a system user to selectively choose between one of the following two operational modes:

a one-way merge mode, wherein the first database is merged with the second database by utilizing the data transfer device to make the copy of the first database available to the second computing device; and a two-way merge mode, wherein the first and second databases are merged with one another by utilizing a network connection to operatively connect the first and second computing devices to each other.

17. A system for merging two databases with one another, the system comprising:

first and second computing devices, each of the first and second computing devices including a microprocessor and memory, the first and second computing devices having respective first and second databases stored thereon, the first and second databases each comprising one or more records containing data, each of the one or more records having a unique identifier and timestamp associated therewith, the first and second computing devices being operatively connected to one another by a network connection, the first computing device being configured to prepare a first listing of one or more unique identifiers and timestamps associated with the one or more records in the first database by selecting each row of table data from the first database and recording only the one or more unique identifiers and timestamps without any other data, the first computing device being configured to send the first listing of the one or more unique identifiers and timestamps associated with the one or more records in the first database to the second computing device;

the second computing device being specially programmed to:

compare the first listing comprising the one or more unique identifiers associated with the one or more records in the first database to a second listing comprising one or more unique identifiers associated with the one or more records in the second database without performing any type of conflict detection or determination for the data in the one or more records;

determine whether each of the one or more unique identifiers in the first listing exists in the second listing, and whether each of the one or more unique identifiers in the second listing exists in the first listing;

when it is determined that one or more unique identifiers in the first listing do not exist in the second listing, add one or more records associated with the one or more unique identifiers that do not exist to a record request list;

when it is determined that one or more unique identifiers in the first listing also exist in the second listing, further determining a most recent version of one or more records associated with the one or more unique identifiers existing in both listings by comparing one or more timestamps in the first listing to one or more timestamps of one or more corresponding records in the second listing, wherein the one or more timestamps of the one or more records having common unique identifiers are compared only once during the performance of the merge procedure;

when it is determined that one or more records in the first listing have a more recent timestamp than one or more corresponding records in the second listing with matching unique identifiers, add the one or more records having more recent timestamps to the record request list without first checking the data in the one or more records for conflicts and without making any determination as to whether or not a conflict exists in the data;

when it is determined that one or more records in the second listing have a more recent timestamp than one or more corresponding records in the first listing with matching unique identifiers, add the one or more records having more recent timestamps to a record send list without first checking the data in the one or more records for conflicts and without making any determination as to whether or not a conflict exists in the data;

when it is determined that one or more unique identifiers in the second listing do not exist in the first listing, add one or more records associated with the one or more unique identifiers that do not exist to the record send list;

wherein the second computing device is configured to transfer the record request list to the first computing device;

wherein the first computing device is configured to export the one or more records listed on the record request list to the second computing device, and the second computing device is configured to export the one or more records listed on the record send list to the first computing device; and wherein no determination is made during the merge procedure as to whether any of the one or more timestamps of the one or more records in the first database is equal to any of the one or more timestamps of the one or more records in the second database.

18. The system according to claim 17, wherein the second computing device is additionally programmed to enable a system user to selectively choose between one of the following two operational modes:
   a one-way merge mode, wherein the first database is merged with the second database by utilizing a data transfer device configured to make a copy of the first database available to the second computing device; and
   a two-way merge mode, wherein the first and second databases are merged with one another by utilizing the network connection operatively connecting the first and second computing devices to each other.

* * * * *